US010526234B2

(12) United States Patent
Genier

(10) Patent No.: US 10,526,234 B2
(45) Date of Patent: Jan. 7, 2020

(54) INTERFACE BLOCK; SYSTEM FOR AND METHOD OF CUTTING A SUBSTRATE BEING TRANSPARENT WITHIN A RANGE OF WAVELENGTHS USING SUCH INTERFACE BLOCK

(71) Applicant: Corning Incorporated, Corning, NY (US)

(72) Inventor: Michael Lucien Genier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/325,200

(22) PCT Filed: Jul. 14, 2015

(86) PCT No.: PCT/US2015/040324
§ 371 (c)(1),
(2) Date: Jan. 10, 2017

(87) PCT Pub. No.: WO2016/010991
PCT Pub. Date: Jan. 21, 2016

(65) Prior Publication Data
US 2017/0158550 A1 Jun. 8, 2017

Related U.S. Application Data

(60) Provisional application No. 62/024,084, filed on Jul. 14, 2014.

(51) Int. Cl.
*B23K 26/36* (2014.01)
*B23K 26/38* (2014.01)
(Continued)

(52) U.S. Cl.
CPC ...... *C03B 33/0222* (2013.01); *B23K 26/0006* (2013.01); *B23K 26/18* (2013.01);
(Continued)

(58) Field of Classification Search
CPC .............. B23K 26/0006; B23K 26/054; B23K 26/0057; B23K 26/0063; B23K 26/352; B23K 26/36–402; B23K 26/50–57
See application file for complete search history.

(56) References Cited

U.S. PATENT DOCUMENTS 1,790,397 A  1/1931  Woods et al.
2,682,134 A  6/1954  Stookey
(Continued)

FOREIGN PATENT DOCUMENTS

CN  2388062 Y  7/2000
CN  1283409 C  11/2006
(Continued)

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.
(Continued)

Primary Examiner — Michael A LaFlame, Jr.
(74) Attorney, Agent, or Firm — Smit Kapadia; Svetlana Z. Short

(57) ABSTRACT

A system for cutting a substrate that is transparent within a predetermined range of wavelengths in the electromagnetic spectrum is provided that includes: a laser capable of emitting light along a light path and of a predetermined wavelength that is within the range of wavelengths in which the substrate is transparent; an optical element positioned in the light path of the laser such that the laser in conjunction with the optical element is capable of generating induced
(Continued)

nonlinear absorption within at least a portion of the substrate; and an interface block composed of a material that is transparent over at least a portion of the predetermined range of wavelengths in the electromagnetic spectrum in which the substrate is also transparent. The interface block is positioned in the light path and between the substrate and the optical element. Further, the substrate will include an edge when extracted from a sheet.

15 Claims, 22 Drawing Sheets

(51) Int. Cl.
  B23K 26/50 (2014.01)
  C03B 33/02 (2006.01)
  B23K 26/00 (2014.01)
  B23K 26/53 (2014.01)
  B23K 26/18 (2006.01)
  C03B 33/07 (2006.01)
  B23K 103/00 (2006.01)

(52) U.S. Cl.
  CPC ............ *B23K 26/53* (2015.10); *C03B 33/074* (2013.01); *B23K 2103/54* (2018.08)

(56) References Cited

U.S. PATENT DOCUMENTS

| | | | |
|---|---|---|---|
| 2,749,794 A | 6/1956 | O'Leary | |
| 3,647,410 A | 3/1972 | Heaton et al. | |
| 3,695,497 A | 10/1972 | Dear | |
| 3,695,498 A | 10/1972 | Dear | |
| 3,729,302 A | 4/1973 | Heaton | |
| 3,775,084 A | 11/1973 | Heaton | |
| 4,226,607 A | 10/1980 | Domken | |
| 4,441,008 A | 4/1984 | Chan | |
| 4,546,231 A | 10/1985 | Gresser et al. | |
| 4,646,308 A | 2/1987 | Kafka et al. | |
| 4,764,930 A | 8/1988 | Bille et al. | |
| 4,891,054 A | 1/1990 | Bricker et al. | |
| 4,907,586 A | 3/1990 | Bille et al. | |
| 4,918,751 A | 4/1990 | Pessot et al. | |
| 4,929,065 A | 5/1990 | Hagerty et al. | |
| 5,035,918 A | 7/1991 | Vyas | |
| 5,040,182 A | 8/1991 | Spinelli et al. | |
| 5,104,210 A | 4/1992 | Tokas | |
| 5,108,857 A | 4/1992 | Kitayama et al. | |
| 5,112,722 A | 5/1992 | Tsujino et al. | |
| 5,114,834 A | 5/1992 | Nachshon | |
| 5,265,107 A | 11/1993 | Delfyett | |
| 5,400,350 A | 3/1995 | Galvanauskas et al. | |
| 5,434,875 A | 7/1995 | Rieger et al. | |
| 5,436,925 A | 7/1995 | Lin et al. | |
| 5,541,774 A * | 7/1996 | Blankenbecler | G02B 3/0037 359/653 |
| 5,553,093 A | 9/1996 | Ramaswamy et al. | |
| 5,574,597 A | 11/1996 | Kataoka et al. | |
| 5,586,138 A | 12/1996 | Yokoyama | |
| 5,656,186 A | 8/1997 | Mourou et al. | |
| 5,676,866 A | 10/1997 | In Den Baumen et al. | |
| 5,684,642 A | 11/1997 | Zumoto et al. | |
| 5,696,782 A | 12/1997 | Harter et al. | |
| 5,736,709 A | 4/1998 | Neiheisel | |
| 5,776,220 A | 7/1998 | Allaire et al. | |
| 6,016,223 A | 1/2000 | Suzuki et al. | |
| 6,016,324 A | 1/2000 | Rieger et al. | |
| 6,033,583 A | 3/2000 | Musket et al. | |
| 6,038,055 A | 3/2000 | Hansch et al. | |
| 6,055,829 A | 5/2000 | Witzmann et al. | |
| 6,078,599 A | 6/2000 | Everage et al. | |
| 6,156,030 A | 12/2000 | Neev | |
| 6,160,835 A | 12/2000 | Kwon | |
| 6,186,384 B1 | 2/2001 | Sawada | |
| 6,210,401 B1 | 4/2001 | Lai | |
| 6,256,328 B1 | 7/2001 | Delfyett et al. | |
| 6,259,151 B1 | 7/2001 | Morrison | |
| 6,259,512 B1 | 7/2001 | Mizouchi | |
| 6,272,156 B1 | 8/2001 | Reed et al. | |
| 6,301,932 B1 | 10/2001 | Allen et al. | |
| 6,322,958 B1 | 11/2001 | Hayashi | |
| 6,339,208 B1 | 1/2002 | Rockstroh et al. | |
| 6,373,565 B1 | 4/2002 | Kafka et al. | |
| 6,381,391 B1 | 4/2002 | Islam et al. | |
| 6,396,856 B1 | 5/2002 | Sucha et al. | |
| 6,407,360 B1 | 6/2002 | Choo et al. | |
| 6,438,996 B1 | 8/2002 | Cuvelier | |
| 6,445,491 B2 | 9/2002 | Sucha et al. | |
| 6,449,301 B1 | 9/2002 | Wu et al. | |
| 6,484,052 B1 | 11/2002 | Visuri et al. | |
| 6,489,589 B1 | 12/2002 | Alexander | |
| 6,501,578 B1 | 12/2002 | Bernstein et al. | |
| 6,552,301 B2 | 4/2003 | Herman et al. | |
| 6,573,026 B1 | 6/2003 | Aitken et al. | |
| 6,592,703 B1 | 7/2003 | Habeck et al. | |
| 6,635,849 B1 | 10/2003 | Okawa et al. | |
| 6,635,850 B2 | 10/2003 | Amako et al. | |
| 6,720,519 B2 | 4/2004 | Liu et al. | |
| 6,729,161 B1 | 5/2004 | Miura et al. | |
| 6,744,009 B1 | 6/2004 | Xuan et al. | |
| 6,787,732 B1 | 9/2004 | Xuan et al. | |
| 6,800,237 B1 | 10/2004 | Yamamoto et al. | |
| 6,800,831 B1 | 10/2004 | Hoetzel | |
| 6,958,094 B2 | 10/2005 | Ohmi et al. | |
| 6,992,026 B2 | 1/2006 | Fukuyo et al. | |
| 7,009,138 B2 | 3/2006 | Amako et al. | |
| 7,353,829 B1 | 4/2008 | Wachter et al. | |
| 7,402,773 B2 | 7/2008 | Nomaru | |
| 7,511,886 B2 | 3/2009 | Schultz et al. | |
| 7,535,634 B1 | 5/2009 | Savchenkov et al. | |
| 7,633,033 B2 | 12/2009 | Thomas et al. | |
| 7,642,483 B2 | 1/2010 | You et al. | |
| 7,649,153 B2 | 1/2010 | Haight et al. | |
| 7,726,532 B2 | 6/2010 | Gonoe | |
| 8,104,385 B2 | 1/2012 | Hayashi et al. | |
| 8,118,971 B2 | 2/2012 | Hori et al. | |
| 8,132,427 B2 | 3/2012 | Brown et al. | |
| 8,168,514 B2 | 5/2012 | Garner et al. | |
| 8,245,539 B2 | 8/2012 | Lu et al. | |
| 8,245,540 B2 | 8/2012 | Abramov et al. | |
| 8,269,138 B2 | 9/2012 | Garner et al. | |
| 8,283,595 B2 | 10/2012 | Fukuyo et al. | |
| 8,292,141 B2 | 10/2012 | Cox et al. | |
| 8,296,066 B2 | 10/2012 | Zhao et al. | |
| 8,327,666 B2 | 12/2012 | Harvey et al. | |
| 8,341,976 B2 | 1/2013 | Dejneka et al. | |
| 8,347,651 B2 | 1/2013 | Abramov et al. | |
| 8,358,888 B2 | 1/2013 | Ramachandran | |
| 8,444,906 B2 | 5/2013 | Lee et al. | |
| 8,448,471 B2 | 5/2013 | Kumatani et al. | |
| 8,518,280 B2 | 8/2013 | Hsu et al. | |
| 8,549,881 B2 | 10/2013 | Brown et al. | |
| 8,584,354 B2 | 11/2013 | Cornejo et al. | |
| 8,584,490 B2 | 11/2013 | Garner et al. | |
| 8,592,716 B2 | 11/2013 | Abramov et al. | |
| 8,604,380 B2 | 12/2013 | Howerton et al. | |
| 8,607,590 B2 | 12/2013 | Glaesemann et al. | |
| 8,616,024 B2 | 12/2013 | Cornejo et al. | |
| 8,635,887 B2 | 1/2014 | Black et al. | |
| 8,680,489 B2 | 3/2014 | Martinez et al. | |
| 8,685,838 B2 | 4/2014 | Fukuyo et al. | |
| 8,697,228 B2 | 4/2014 | Carre et al. | |
| 8,720,228 B2 | 5/2014 | Li | |
| 8,826,696 B2 | 9/2014 | Brown et al. | |
| 8,852,698 B2 | 10/2014 | Fukumitsu | |
| 8,887,529 B2 | 11/2014 | Lu et al. | |
| 8,916,798 B2 | 12/2014 | Plüss et al. | |
| 8,943,855 B2 | 2/2015 | Gomez et al. | |
| 8,971,053 B2 | 3/2015 | Kariya et al. | |
| 9,138,913 B2 | 9/2015 | Arai et al. | |
| 9,227,868 B2 | 1/2016 | Matsumoto et al. | |
| 9,290,407 B2 | 3/2016 | Barefoot et al. | |
| 9,296,066 B2 | 3/2016 | Hosseini et al. | |

(56) References Cited

U.S. PATENT DOCUMENTS

| | | | |
|---|---|---|---|
| 9,324,791 B2 | 4/2016 | Tamemoto | |
| 9,327,381 B2 | 5/2016 | Lee et al. | |
| 9,446,590 B2 | 9/2016 | Chen et al. | |
| 9,481,598 B2 | 11/2016 | Bergh et al. | |
| 2002/0046997 A1 | 4/2002 | Nam et al. | |
| 2002/0082466 A1 | 6/2002 | Han | |
| 2002/0097486 A1 | 7/2002 | Yamaguchi et al. | |
| 2002/0110639 A1 | 8/2002 | Bruns | |
| 2003/0006221 A1 | 1/2003 | Hong et al. | |
| 2003/0007773 A1 | 1/2003 | Kondo et al. | |
| 2004/0221615 A1 | 11/2004 | Postupack et al. | |
| 2005/0024743 A1 | 2/2005 | Camy-Peyret | |
| 2005/0098548 A1 | 5/2005 | Kobayashi et al. | |
| 2005/0115938 A1 | 6/2005 | Sawaki et al. | |
| 2005/0205778 A1* | 9/2005 | Kitai | B23K 26/032 250/309 |
| 2005/0274702 A1 | 12/2005 | Deshi | |
| 2005/0277270 A1 | 12/2005 | Yoshikawa et al. | |
| 2006/0011593 A1 | 1/2006 | Fukuyo | |
| 2006/0028728 A1 | 2/2006 | Li | |
| 2006/0109874 A1 | 5/2006 | Shiozaki et al. | |
| 2006/0127679 A1 | 6/2006 | Gulati et al. | |
| 2006/0151450 A1 | 7/2006 | You et al. | |
| 2006/0227440 A1 | 10/2006 | Gluckstad | |
| 2006/0266744 A1 | 11/2006 | Nomaru | |
| 2006/0289410 A1 | 12/2006 | Morita et al. | |
| 2006/0291835 A1* | 12/2006 | Nozaki | H01L 21/67115 392/416 |
| 2007/0045253 A1* | 3/2007 | Jordens | B23K 26/03 219/121.71 |
| 2007/0091977 A1 | 4/2007 | Sohn et al. | |
| 2007/0111390 A1 | 5/2007 | Komura et al. | |
| 2007/0111480 A1 | 5/2007 | Maruyama et al. | |
| 2007/0119831 A1 | 5/2007 | Kandt | |
| 2007/0132977 A1 | 6/2007 | Komatsuda | |
| 2007/0138151 A1 | 6/2007 | Tanaka et al. | |
| 2007/0177116 A1 | 8/2007 | Amako | |
| 2007/0202619 A1 | 8/2007 | Tamura et al. | |
| 2007/0298529 A1 | 12/2007 | Maeda et al. | |
| 2008/0000884 A1 | 1/2008 | Sugiura et al. | |
| 2008/0079940 A1 | 4/2008 | Sezerman et al. | |
| 2008/0099444 A1 | 5/2008 | Misawa et al. | |
| 2009/0013724 A1 | 1/2009 | Koyo et al. | |
| 2009/0176034 A1 | 7/2009 | Ruuttu et al. | |
| 2009/0183764 A1 | 7/2009 | Meyer | |
| 2009/0242528 A1 | 10/2009 | Howerton et al. | |
| 2009/0250446 A1 | 10/2009 | Sakamoto | |
| 2009/0294419 A1 | 12/2009 | Abramov et al. | |
| 2009/0294422 A1 | 12/2009 | Lubatschowski et al. | |
| 2009/0324899 A1 | 12/2009 | Feinstein et al. | |
| 2010/0025387 A1 | 2/2010 | Arai et al. | |
| 2010/0029460 A1 | 2/2010 | Shojiya et al. | |
| 2010/0032087 A1 | 2/2010 | Takahashi et al. | |
| 2010/0038349 A1* | 2/2010 | Ke | B23K 26/046 219/121.69 |
| 2010/0086741 A1 | 4/2010 | Bovatsek et al. | |
| 2010/0089631 A1 | 4/2010 | Sakaguchi et al. | |
| 2010/0089882 A1 | 4/2010 | Tamura | |
| 2010/0102042 A1 | 4/2010 | Garner et al. | |
| 2010/0129603 A1 | 5/2010 | Blick et al. | |
| 2010/0147813 A1 | 6/2010 | Lei et al. | |
| 2010/0252540 A1 | 10/2010 | Lei et al. | |
| 2010/0252959 A1 | 10/2010 | Lei et al. | |
| 2010/0276505 A1 | 11/2010 | Smith | |
| 2010/0279067 A1 | 11/2010 | Sabia et al. | |
| 2010/0287991 A1 | 11/2010 | Brown et al. | |
| 2010/0326138 A1 | 12/2010 | Kumatani et al. | |
| 2011/0049764 A1 | 3/2011 | Lee et al. | |
| 2011/0049765 A1 | 3/2011 | Li et al. | |
| 2011/0088324 A1 | 4/2011 | Wessel | |
| 2011/0100401 A1 | 5/2011 | Fiorentini | |
| 2011/0132881 A1 | 6/2011 | Liu | |
| 2011/0139760 A1 | 6/2011 | Shah et al. | |
| 2011/0183116 A1 | 7/2011 | Hung et al. | |
| 2011/0210105 A1 | 9/2011 | Romashko et al. | |
| 2011/0240611 A1 | 10/2011 | Sandström | |
| 2011/0277507 A1 | 11/2011 | Lu et al. | |
| 2011/0318555 A1 | 12/2011 | Bookbinder et al. | |
| 2012/0017642 A1 | 1/2012 | Teranishi et al. | |
| 2012/0047951 A1 | 3/2012 | Dannoux et al. | |
| 2012/0048604 A1 | 3/2012 | Cornejo et al. | |
| 2012/0061440 A1 | 3/2012 | Roell | |
| 2012/0064306 A1 | 3/2012 | Kang et al. | |
| 2012/0067858 A1 | 3/2012 | Kangastupa et al. | |
| 2012/0103018 A1 | 5/2012 | Lu et al. | |
| 2012/0131962 A1 | 5/2012 | Mitsugi et al. | |
| 2012/0135195 A1 | 5/2012 | Glaesemann et al. | |
| 2012/0135607 A1 | 5/2012 | Shimoi et al. | |
| 2012/0135608 A1 | 5/2012 | Shimoi et al. | |
| 2012/0145331 A1 | 6/2012 | Gomez et al. | |
| 2012/0196071 A1 | 8/2012 | Cornejo et al. | |
| 2012/0234049 A1 | 9/2012 | Bolton | |
| 2012/0234807 A1 | 9/2012 | Sercel et al. | |
| 2012/0255935 A1 | 10/2012 | Kakui et al. | |
| 2012/0299219 A1 | 11/2012 | Shimoi et al. | |
| 2012/0302139 A1 | 11/2012 | Darcangelo et al. | |
| 2013/0019637 A1 | 1/2013 | Sol et al. | |
| 2013/0034688 A1 | 2/2013 | Koike et al. | |
| 2013/0044371 A1 | 2/2013 | Rupp et al. | |
| 2013/0056450 A1 | 3/2013 | Lissotschenko et al. | |
| 2013/0061636 A1 | 3/2013 | Imai et al. | |
| 2013/0068736 A1 | 3/2013 | Mielke et al. | |
| 2013/0075480 A1 | 3/2013 | Yokogi et al. | |
| 2013/0091897 A1 | 4/2013 | Fugii et al. | |
| 2013/0122264 A1 | 5/2013 | Fujii et al. | |
| 2013/0126573 A1 | 5/2013 | Hosseini et al. | |
| 2013/0129947 A1 | 5/2013 | Harvey et al. | |
| 2013/0133367 A1 | 5/2013 | Abramov et al. | |
| 2013/0216573 A1 | 5/2013 | Hosseini et al. | |
| 2013/0143416 A1 | 6/2013 | Norval | |
| 2013/0149434 A1 | 6/2013 | Oh et al. | |
| 2013/0149494 A1 | 6/2013 | Koike et al. | |
| 2013/0167590 A1* | 7/2013 | Teranishi | C03B 33/0222 65/112 |
| 2013/0174607 A1 | 7/2013 | Wootton et al. | |
| 2013/0174610 A1 | 7/2013 | Teranishi et al. | |
| 2013/0180285 A1 | 7/2013 | Kariya | |
| 2013/0189806 A1 | 7/2013 | Hoshino | |
| 2013/0192305 A1 | 8/2013 | Black et al. | |
| 2013/0209731 A1 | 8/2013 | Nattermann et al. | |
| 2013/0220982 A1 | 8/2013 | Thomas et al. | |
| 2013/0221053 A1 | 8/2013 | Zhang | |
| 2013/0224439 A1 | 8/2013 | Zhang et al. | |
| 2013/0228918 A1 | 9/2013 | Chen et al. | |
| 2013/0247615 A1 | 9/2013 | Boek et al. | |
| 2013/0248504 A1* | 9/2013 | Kusuda | H01L 21/324 219/121.85 |
| 2013/0266757 A1 | 10/2013 | Giron et al. | |
| 2013/0270240 A1 | 10/2013 | Kondo | |
| 2013/0280495 A1 | 10/2013 | Matsumoto | |
| 2013/0288010 A1 | 10/2013 | Akarapu et al. | |
| 2013/0291598 A1 | 11/2013 | Saito et al. | |
| 2013/0312460 A1 | 11/2013 | Kunishi et al. | |
| 2013/0323469 A1 | 12/2013 | Abramov et al. | |
| 2013/0334185 A1 | 12/2013 | Nomaru | |
| 2013/0340480 A1 | 12/2013 | Nattermann et al. | |
| 2014/0027951 A1 | 1/2014 | Srinivas et al. | |
| 2014/0034730 A1 | 2/2014 | Lee | |
| 2014/0042202 A1 | 2/2014 | Lee | |
| 2014/0047957 A1 | 2/2014 | Wu | |
| 2014/0102146 A1 | 4/2014 | Saito et al. | |
| 2014/0110040 A1 | 4/2014 | Cok | |
| 2014/0113797 A1 | 4/2014 | Yamada et al. | |
| 2014/0133119 A1 | 5/2014 | Kariya et al. | |
| 2014/0141217 A1 | 5/2014 | Gulati et al. | |
| 2014/0147623 A1 | 5/2014 | Shorey et al. | |
| 2014/0147624 A1 | 5/2014 | Streltsov et al. | |
| 2014/0165652 A1 | 6/2014 | Saito | |
| 2014/0174131 A1 | 6/2014 | Saito et al. | |
| 2014/0199519 A1 | 7/2014 | Schillinger et al. | |
| 2014/0216108 A1 | 8/2014 | Weigel et al. | |
| 2014/0290310 A1 | 10/2014 | Green | |
| 2014/0320947 A1 | 10/2014 | Egerton et al. | |
| 2014/0333929 A1 | 11/2014 | Sung et al. | |

(56) References Cited

U.S. PATENT DOCUMENTS

| | | |
|---|---|---|
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1* | 3/2015 | Mader ............ B23K 26/009 65/112 |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0059359 A1* | 3/2016 | Krueger ............ B23K 26/0057 65/29.1 |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0052381 A1 | 2/2017 | Huang et al. |
| 2017/0169847 A1 | 6/2017 | Tamaki |
| 2017/0368638 A1 | 12/2017 | Tayebati et al. |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| DE | 2231330 A1 | 10/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 | 11/1994 |
| JP | 9106243 A | 4/1997 |
| JP | 11197498 | 7/1999 |
| JP | 11269683 | 10/1999 |
| JP | 11330597 | 11/1999 |
| JP | 11347758 | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201226345 | 7/2012 |
| WO | 1999029243 | 6/1999 |
| WO | 1999063900 | 12/1999 |
| WO | 2004110693 A1 | 12/2004 |
| WO | 2006073098 A1 | 7/2006 |

(56) References Cited

FOREIGN PATENT DOCUMENTS

| WO | 2007094160 A1 | 8/2007 |
|---|---|---|
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | WO 2014/012125 A1 * | 1/2014 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | WO 2014/161534 A3 * | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Ahmed, F. et al.; Display glass cutting by femtosecond laser induced single shot periodic void array; Applied Physics a Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Cutting Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda, K. et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

(56) References Cited

OTHER PUBLICATIONS

Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov, A. et al.; Laser separation of chemically strengthened glass; ScienceDirect Physics Procedia; 2010; pp. 285-290; vol. 5; Elsevier B.V.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.
Xu, H. et al.; Optimization of 3D laser cutting head orientation based on minimum energy consumption; Int J Adv Manuf Technol; Jun. 28, 2014; pp. 1283-1291; vol. 74; Springer-Verlag London.
Arimoto, R. et al.; Imaging properties of axicon in a scanning optical system; Applied Optics; Nov. 1, 1991; pp. 6653-6657; vol. 31, No. 31; Optical Society of America.
Betriebsanleitung; TruMicro 5000; Aug. 2011; pp. 1-4.
Bhuyan, M. et al.; High aspect ratio nanochannel machining using single shot femtosecond Bessel beams; Applied Physics Letters; Aug. 23, 2010; pp. 081102-1-081102-3; vol. 97.
Bhuyan, M. et al.; High aspect ratio taper-free microchannel fabrication using femtosecond Bessel beams; Optics Express; Jan. 18, 2010; pp. 566-574; vol. 18, No. 2; Optical Society of America.
Cubeddu, R. et al.; A compact time-resolved reflectance system for dual-wavelength multichannel assessment of issue absorption and scattering; SPIE Conference on Optical Tomography and Spectroscopy of Tissue III; San Jose, California; Jan. 1999; pp. 450-455; vol. 3597; SPIE.
Cubeddu, R. et al.; Compact tissue oximeter based on dual-wavelength multichannel time-resolved reflectance; Applied Optics; Jun. 1, 1999; pp. 3670-3680; vol. 38, No. 16; Optical Society of America.
Ding, Z. et al.; High-resolution optical coherence tomography over a large depth range with an axicon lens; Optics Letters; Feb. 15, 2002; pp. 243-245; vol. 27, No. 4; Optical Society of America.
EagleEtch; TheAnti-glare Glass for Technical Display Applications; Glass and Polymer Technologies; pp. 1-8; EuropTec USA Inc.
Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.
Glezer, E. et al.; Ultrafast-laser driven micro-explosions in transparent materials; Applied Physics Letters; 1997; pp. 882-884, vol. 71.
Golub, I.; Fresnel axicon; Optics Letters; Jun. 15, 2006; pp. 1890-1892;. vol. 31, No. 12; Optical Society of America.
Herman, P. et al.; Laser micromachining of 'transparent' fused silica with 1-ps pulses and pulse trains; SPIE Conference on Commercial and Biomedical Applications of Ultrafast Lasers; San Jose, California; Jan. 1999; pp. 148-155; vol. 3616; SPIE.
Kosareva, O. et al.; Formation of extended plasma channels in a condensed medium upon axicon focusing of a femtosecond laser pulse; Quantum Electronics; 2005; pp. 1013-1014; vol. 35, No. 11; Kvantovaya Elektronika and Turpion Ltd.
Kruger, J. et al.; Femtosecond-pulse visible laser processing of transparent materials; Applied Surface Science; 1996; pp. 430-438; Elsevier B.V.
Kruger, J. et al.; Laser micromachining of barium aluminium borosilicate glass with pulse durations between 20 fs and 3 ps; Applied Surface Science; 1998; pp. 892-898; Elsevier B.V.
Kruger, J. et al.; Structuring of dielectric and metallic materials with ultrashort laser pulses between 20 fs and 3 ps; SPIE Proceedings; San Jose, California; Feb. 8, 1997; pp. 40-47 vol. 2991; SPIE.
Lapczyna, M. et al.; Ultra high repetition rate (133 MHz) laser ablation of aluminum with 1.2-ps pulses; Applied Physics A Materials Science & Processing; Dec. 28, 1999; pp. S883-S886; vol. 69 (Supply).; Springer-Verlag.
Perry, M. et al.; Ultrashort-Pulse Laser Machining; Lawrence Livermore National Laboratory; Sep. 1998; pp. 1-30.
Perry, M. et al.; Ultrashort-Pulse Laser Machining; International Congress on Applications of Lasers and Electro-Optics; Orlando, Florida; Nov. 16-19, 1998; pp. 1-24.
Perry, M. et al.; Ultrashort-pulse laser machining of dielectric materials; Journal of Applied Physics; May 1, 1999; pp. 6803-6810; vol. 85, No. 9; American Institute of Physics.
PHAROS High-power Femtosecond Laser System specification; Light Conversion; 2011; pp. 1-2.
Polynkin, P. et al.; Extended filamentation with temporally chirped femtosecond Bessel-Gauss beams in air; Optics Express; Jan. 19, 2009; pp. 575-584; vol. 17, No. 2; Optical Society of America.
Serafetinides, A. et al.; Ultra-short pulsed laser ablation of polymers; Applied Surface Science; 2011; pp. 42-56; vol. 180; Elsevier Science B.V.
Sundaram, S. et al.; Inducing and probing non-thermal transitions in semiconductors using femtosecond laser pulses; Nature Materials; Dec. 2002; pp. 217-224; vol. 1; Nature Publishing Group.
Vanagas, E. et al.; Glass cutting by femtosecond pulsed irradiation; Journal of Micro/Nanolithography, MEMS, and MOEMS; Mar. 31, 2004; pp. 1-18; vol. 3, Issue 2; SPIE.
Varel, H. et al.; Micromachining of quartz with ultrashort laser pulses; Applied Physics a Materials Science & Processing; 1997; pp. 367-373; vol. 65.
Yoshino, F. et al.; Micromachining with a High Repetition Rate Femtosecond Fiber Laser; JLMN—Journal of Laser Micro/Nanoengineering; 2008; pp. 157-162; vol. 3, No. 3.
Zeng, D. et al.; Characteristic analysis of refractive axicon system for optical trepanning; Optical Engineering; Sep. 2006; pp. 094302-1-094302-10; vol. 45, No. 9.
Zhang, G. et al.; Design of diffractive-phase axicon illuminated by a Gaussian-profile beam; Acta Physica Sinica; May 1996; pp. 354-364; vol. 5, No. 5; Chin. Phys. Soc.
Kerr. "Filamentary tracks formed in transparent optical glass by laser beam self-focusing. II. Theoretical Analysis" Physical Review A. 4(3) 1971, pp. 1196-1218.

* cited by examiner

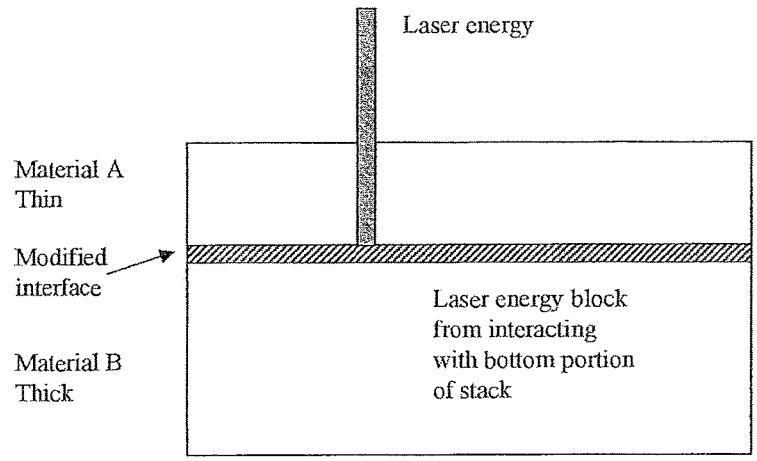
FIG. 1
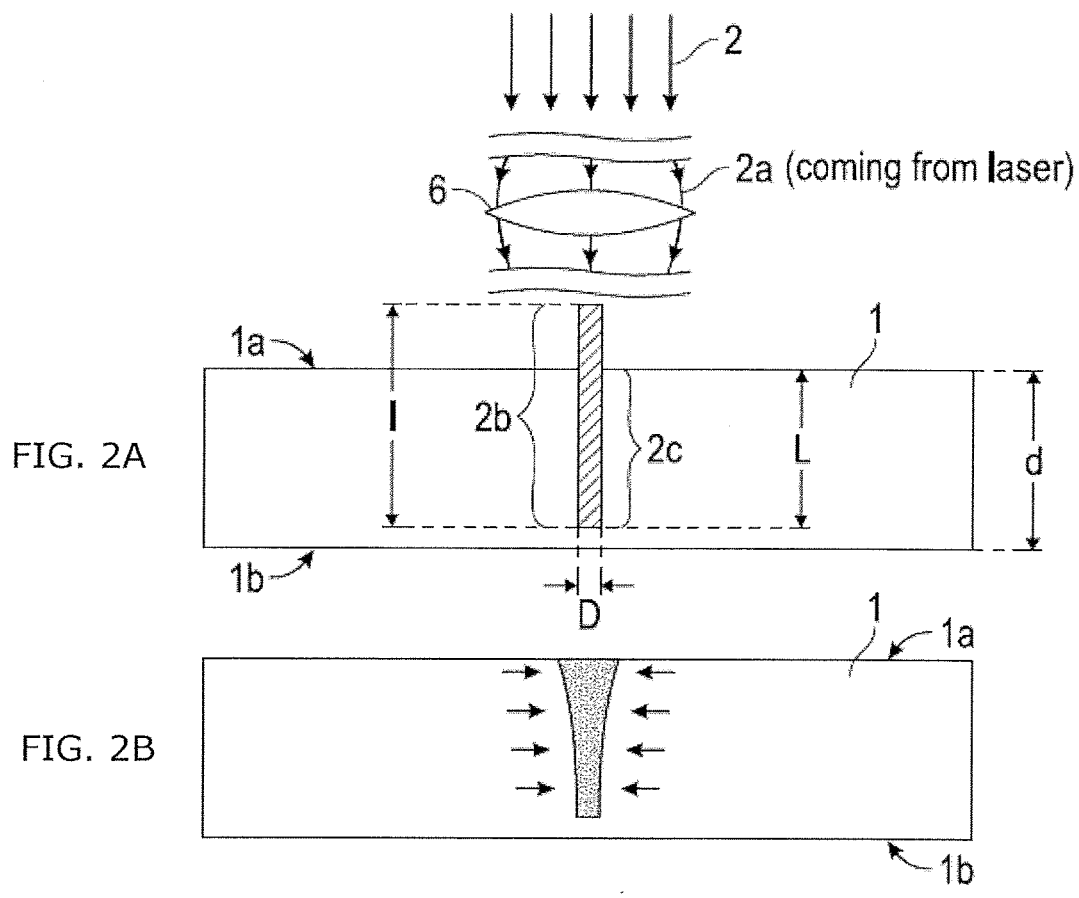
FIG. 2A
FIG. 2B

Z1a+Z1b = Z1

INTERFACE BLOCK; SYSTEM FOR AND METHOD OF CUTTING A SUBSTRATE BEING TRANSPARENT WITHIN A RANGE OF WAVELENGTHS USING SUCH INTERFACE BLOCK

CROSS-REFERENCE TO RELATED APPLICATIONS

This application claims the benefit of priority under 35 U.S.C. § 371 of International Application No. PCT/US2015/40324, filed on Jul. 14, 2015, which claims the benefit of priority under 35 U.S.C. § 119 of U.S. Provisional Application Ser. No. 62/024,084 filed on Jul. 14, 2014 the content of which is relied upon and incorporated herein by reference in its entirety.

BACKGROUND

The present invention generally relates to laser cutting devices used in the cutting of transparent material substrate, and more particularly to such devices and systems used to cut and finish edges of the transparent material substrate.

The area of laser processing of materials encompasses a wide variety of applications that involve cutting, drilling, milling, welding, melting, etc. and different types of materials. Among these applications is the cutting and/or separating of different types of substrates and in particular the separation of arbitrary shapes out of transparent materials.

From process development and cost perspectives there are opportunities to improve upon the cutting and separation of glass substrates. Among several alternative technologies, laser separation has been tried and demonstrated using different approaches. The techniques range from actual removal of material between the boundaries of the desired part or parts and its matrix, creation of defects within the bulk of the material to weaken or seed it with cracking initiation points along the perimeter of the desired profile followed by a secondary breaking step, and propagation of an initial crack by thermal stress separation.

While such laser cutting processes have demonstrated potential economic and technical advantages such as precision, good edge finish, and low residual stress, the edge finishing still results in the need to deburr and polish the edges in a separate process, and when a bevel is desired around the peripheral edge of the substrate, yet another process is required.

SUMMARY OF THE INVENTION

An embodiment of the present invention provides a system for cutting a substrate that is transparent within a predetermined range of wavelengths in the electromagnetic spectrum and will include an edge when extracted from a sheet of substrate. The system generally comprises a laser capable of emitting light along a light path and of a predetermined wavelength that is within the range of wavelengths in which the substrate is transparent; an optical device positioned in the light path of the laser; and an interface block composed of a material that is transparent over at least a portion of the predetermined range of wavelengths in the electromagnetic spectrum in which the substrate is also transparent, wherein said interface block is positioned in said light path and between the substrate and said optical element.

Preferably, according to some embodiments, an optical element positioned in the light path of said laser, such that said laser in conjunction with the optical generatic induced nonlinear absorption within at least a portion of the substrate. According to some embodiments the laser beam is directed into the substrate, and generates an induced non-linear absorption within the substrate material, and the induced nonlinear absorption modifies the substrate material along the laser beam within the substrate. According to some embodiments the laser is a pulsed laser and produces a pulsed laser beam, optical device is structured to focus the pulsed laser beam into a laser beam focal line oriented along the beam propagation direction and directed into the substrate, the laser beam focal line capable of generating an induced non-linear absorption within the substrate material that produces a defect line along the laser beam focal line within the substrate.

In one aspect of the present invention, the interface block is formed as a rectangular parallelepiped. In another aspect of the invention, the interface block is formed as a triangular parallelepiped. In a further aspect of the invention, the interface block includes a notched shoulder formed along one edge thereof and in which an edge of the substrate may be received.

In another aspect of the present invention, the interface block is formed as a frame that may be positioned on a large sheet of substrate in order to process and perform edge cuts and extraction of a smaller sheet of substrate from the larger sheet.

Another embodiment of the present invention provides an interface block for use in a system for cutting the edge of a substrate that is transparent within a predetermined range of wavelengths in the electromagnetic spectrum. The interface block comprises a parallelepiped shaped block of material that is transparent over at least a portion of the predetermined range of wavelengths in the electromagnetic spectrum in which the substrate is also transparent.

Another embodiment of the present invention provides a method for cutting adjacent the edge of a substrate that is transparent within a predetermined range of wavelengths in the electromagnetic spectrum, comprising the steps of arranging a laser, an optical element and an interface block such that a beam of light emitted from said laser will pass first through said optical element and subsequently through said interface block. The interface block is composed of a parallelepiped shaped material that is transparent over at least a portion of the predetermined range of wavelengths in the electromagnetic spectrum in which the substrate is also transparent. The method further comprises the step of positioning said interface block in juxtaposed relation to said edge of said substrate, and emitting a beam of light from said laser at a wavelength that is within the range of wavelengths in which the substrate is transparent, wherein the emitted beam of light follows a path through the optical element and the interface block, and the interface block causes the beam of light to angularly intersect and pass through the substrate adjacent its edge.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the representative embodiments.

FIG. 1 is an illustration of a stack of three layers according to an embodiment: a thin material A facing the laser energy, a modified interface, and a thick material B, the modified interface disrupting the laser energy form interacting with the portion of the stack on the side of the modified interface remote from the laser beam;

FIGS. 2A and 2B are illustrations showing the positioning of a laser beam focal line according to an embodiment;

FIGS. 3B-1, 3B-2, 3B-3, and 3B-4 illustrate various possibilities for processing the substrate by forming the laser beam focal line at different positions within the transparent material relative to the substrate according to embodiments;

FIG. 4 is an illustration of a second optical assembly for laser processing according to an embodiment;

DETAILED DESCRIPTION

A description of example embodiments follows.

Figure 20A:
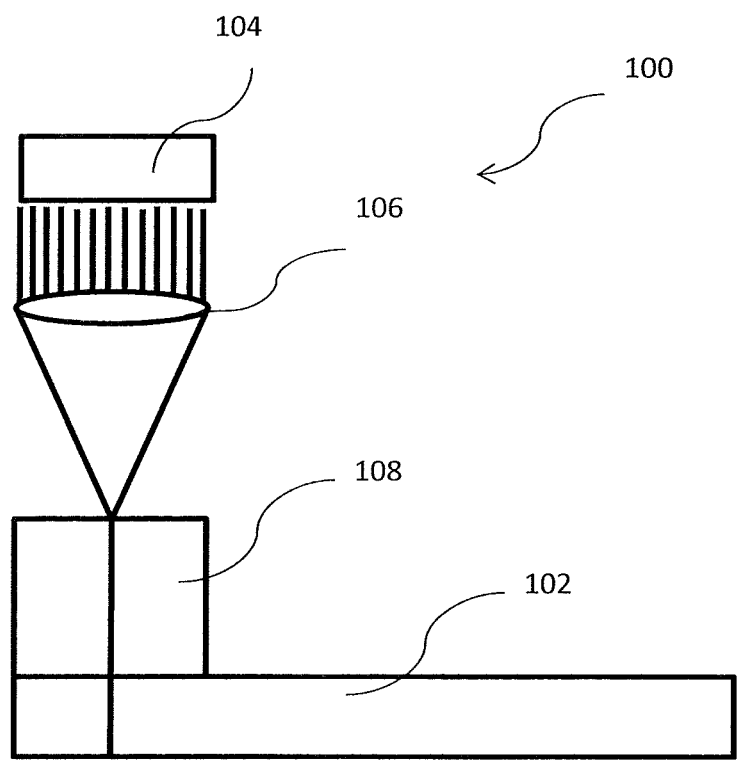
FIGS. 20A-20B are side elevation schematic views of a rectangular interface block to cut close to the edge of a substrate, and a substrate that has been cut using the interface block, respectively.
Figure 21A:
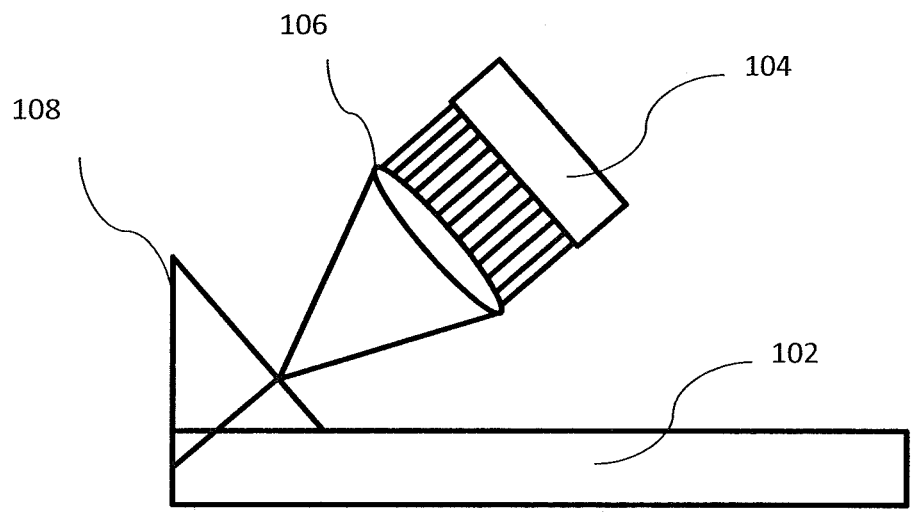
FIGS. 21A-21B are side elevation schematic views of a triangular interface block to cut a bevel at the edge of a substrate, and a substrate that has been cut using the interface block, respectively.
Figure 21B:
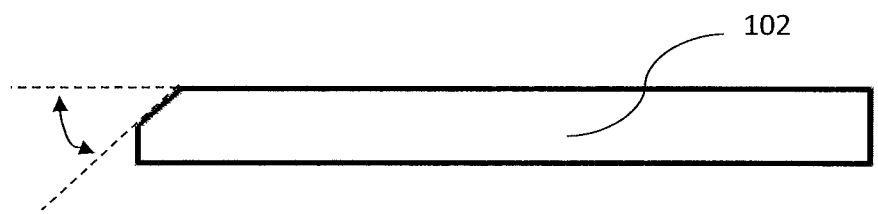

Referring now to the drawings, wherein like reference numerals refer to like parts throughout, there is seen in FIGS. 20A and 21A a system, designated generally by reference numeral 100, for cutting a substrate 102. Generally, system 100 comprises a laser 104, an optical device 106 that is positioned in the pathway of the laser for focusing the laser's light in a desired manner, and an interface block 108 positioned in juxtaposed relation to substrate 102 and in the pathway of the laser's light beam as focused by optical device 106. The laser beam arrangement, optical device, and interface block, along with the method of using the interface block and a system using the interface block are all described in greater detail hereinafter. Prior to describing this system 100, however, and in order to fully appreciate the present invention, a description of example embodiments of laser cutting systems employed in the present system 100, are described.

Laser Cutting of Substrate

The embodiment described herein relates to a method and apparatus for optically producing high precision cuts in or through transparent materials. Sub-surface damage may be limited to the order of 60 microns in depth or less, and the cuts may produce only low debris. Cutting of a transparent material with a laser in accordance with the present disclosure may also be referred to herein as drilling or laser drilling or laser processing. A material is substantially transparent to the laser wavelength when the absorption is less than about 10%, preferably less than about 1% per mm of material depth at this wavelength.

In accordance with methods described below, in a single pass, a laser can be used to create highly controlled full line perforation through the material, with extremely little (<75 μm, often <50 μm) subsurface damage and debris generation. This is in contrast to the typical use of a spot-focused laser to ablate material, where multiple passes are often necessary to completely perforate the glass thickness, large amounts of debris are formed from the ablation process, and more extensive sub-surface damage (>100 μm) and edge chipping occur.

Thus, it is possible to create a microscopic (i.e., <0.5 μm and >100 nm in diameter) elongated "hole" (also called a perforation or a defect line) in transparent material using a single high energy burst pulse. These individual perforations can be created at rates of several hundred kilohertz (several hundred thousand perforations per second, for example).

Thus, with relative motion between the source and the material these perforations can be placed adjacent to one another (spatial separation varying from sub-micron to several microns as desired). This spatial separation is selected in order to facilitate cutting. In some embodiments the defect line is a "through hole", which is a hole or an open channel that extends from the top to the bottom of the transparent material. In some embodiments the defect line may not be a continuous channel, and may be blocked or partially blocked by portions or sections of solid material (e.g., glass). As defined herein, the internal diameter of the defect line is the internal diameter of the open channel or the air hole. For example, in the embodiments described herein the internal diameter of the defect line is <500 nm, for example ≤400 nm, or ≤300 nm. The disrupted or modified area (e.g., compacted, melted, or otherwise changed) of the material surrounding the holes in the embodiments disclosed herein, preferably has diameter of <50 μm (e.g, <0.10 μm).

In addition micromachining and selective cutting of a stack of transparent materials is accomplished with precise control of the depth of cut through selection of an appropriate laser source and wavelength along with beam delivery optics, and the placement of a beam disruption element at the boundary of a desired layer. The beam disruption element may be a layer of material or an interface. The beam disruption element may be referred to herein as a laser beam disruption element, disruption element or the like. Embodiments of the beam disruption element may be referred to herein as a beam disruption layer, laser beam disruption layer, disruption layer, beam disruption interface, laser beam disruption interface, disruption interface, or the like.

The beam disruption element reflects, absorbs, scatters, defocuses or otherwise interferes with an incident laser beam to inhibit or prevent the laser beam from damaging or otherwise modifying underlying layers in the stack. In one embodiment, the beam disruption element underlies the layer of transparent material in which laser drilling will occur. As used herein, the beam disruption element underlies the transparent material when placement of the beam disruption element is such that the laser beam must pass through the transparent material before encountering the beam disruption element. The beam disruption element may underlie and be directly adjacent to the transparent layer in which laser drilling will occur. Stacked materials can be micromachined or cut with high selectivity by inserting a layer or modifying the interface such that a contrast of optical properties exists between different layers of the stack. By making the interface between materials in the stack more reflective, absorbing, and/or scattering at the laser wavelengths of interest, cutting can be confined to one portion or layer of the stack.

The wavelength of the laser is selected so that the material within the stack to be laser processed (drilled, cut, ablated, damaged or otherwise appreciably modified by the laser) is transparent to the laser wavelength. In one embodiment, the material to be processed by the laser is transparent to the laser wavelength if it absorbs less than 10% of the intensity of the laser wavelength per mm of thickness of the material. In another embodiment, the material to be processed by the laser is transparent to the laser wavelength if it absorbs less than 5% of the intensity of the laser wavelength per mm of thickness of the material. In still another embodiment, the material to be processed by the laser is transparent to the laser wavelength if it absorbs less than 2% of the intensity of the laser wavelength per mm of thickness of the material. In yet another embodiment, the material to be processed by the laser is transparent to the laser wavelength if it absorbs less than 1% of the intensity of the laser wavelength per mm of thickness of the material.

The selection of the laser source is further predicated on the ability to induce multi-photon absorption (MPA) in the transparent material. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two photons. MPA is a third-order nonlinear process that is several orders of magnitude weaker than linear absorption. It differs from linear absorption in that the strength of absorption depends on the square of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region. Moreover, within the focal region, the energy density may be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA).

Thus, atoms and bonds can be selectively excited or ionized in the regions of a material where the energy density of the laser beam is sufficiently high to induce nonlinear TPA of a laser wavelength having half the required excitation energy, for example. MPA can result in a local reconfiguration and separation of the excited atoms or bonds from adjacent atoms or bonds. The resulting modification in the bonding or configuration can result in non-thermal modification or separation of matter from the region of the material in which MPA occurs. This modification or separation creates a structural defect (e.g. a defect line or "perforation") that mechanically weakens the material and renders it more susceptible to cracking or fracturing upon application of mechanical or thermal stress. By controlling the placement of perforations, a contour or path along which cracking occurs can be precisely defined so that precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

Perforations can be accomplished with a single "burst" of high energy short duration pulses spaced close together in time. The laser pulse duration may be $10^{-10}$ s or less, or $10^{-11}$ s or less, or $10^{-12}$ s or less, or $10^{-13}$ s or less. These "bursts" may be repeated at high repetition rates (e.g. kHz or MHz). The perforations may be spaced apart and precisely positioned by controlling the velocity of a substrate or stack relative to the laser through control of the motion of the laser and/or the substrate or stack.

As an example, in a thin transparent substrate moving at 200 mm/sec exposed to a 100 kHz series of pulses, the individual pulses would be spaced 2 microns apart to create a series of perforations separated by 2 microns. This defect (perforation) spacing is sufficient close to allow for mechanical or thermal separation along the contour defined by the series of perforations.

Thermal Separation

In some cases, a fault line created along a contour defined by a series of perforations or defect lines is not enough to separate the part spontaneously, and a secondary step may be necessary. If so desired, a second laser can be used to create thermal stress to separate it, for example. In the case of sapphire, separation can be achieved, after the creation of a fault line, by application of mechanical force or by using a thermal source (e.g., an infrared laser, for example a $CO_2$ laser) to create thermal stress and force a part to separate from a substrate. Another option is to have the $CO_2$ laser start the separation and then finish the separation process using a manual technique. The optional $CO_2$ laser separation can be achieved, for example, with a defocused continuous wave (cw) laser emitting at 10.6 μm and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, spot sizes of about 7 mm, 2 mm and 20 mm can be used for $CO_2$ lasers, whose emission wavelength is much smaller at 10.6 μm. Distance between adjacent defect lines 120 along the direction of the fault lines 110 can be greater than 0.5 μm and less than or equal to about 15 μm in some embodiments, for example.

Etching

Acid etching can be used, for example, to separate a workpiece having a glass layer, for example. To enlarge the holes to a size useful for metal filling and electrical connections, parts can be acid etched. In one embodiment, for example, the acid used can be 10% HF/15% $HNO_3$ by volume. The parts can be etched for 53 minutes at a temperature of 24-25° C. to remove about 100 μm of material, for example. The parts can be immersed in this acid bath, and ultrasonic agitation at a combination of 40 kHz and 80 kHz frequencies can used to facilitate penetration of fluid and fluid exchange in the holes. In addition, manual agitation of the part within the ultrasonic field can be made to prevent standing wave patterns from the ultrasonic field from creating "hot spots" or cavitation related damage on the part. The acid composition and etch rate can be intentionally designed to slowly etch the part—a material removal rate of only 1.9 μm/minute, for example. An etch rate of less than about 2 μm/minute, for example, allows acid to fully penetrate the narrow holes and agitation to exchange fresh fluid and remove dissolved material from the holes which are initially very narrow.

Figure 3A:
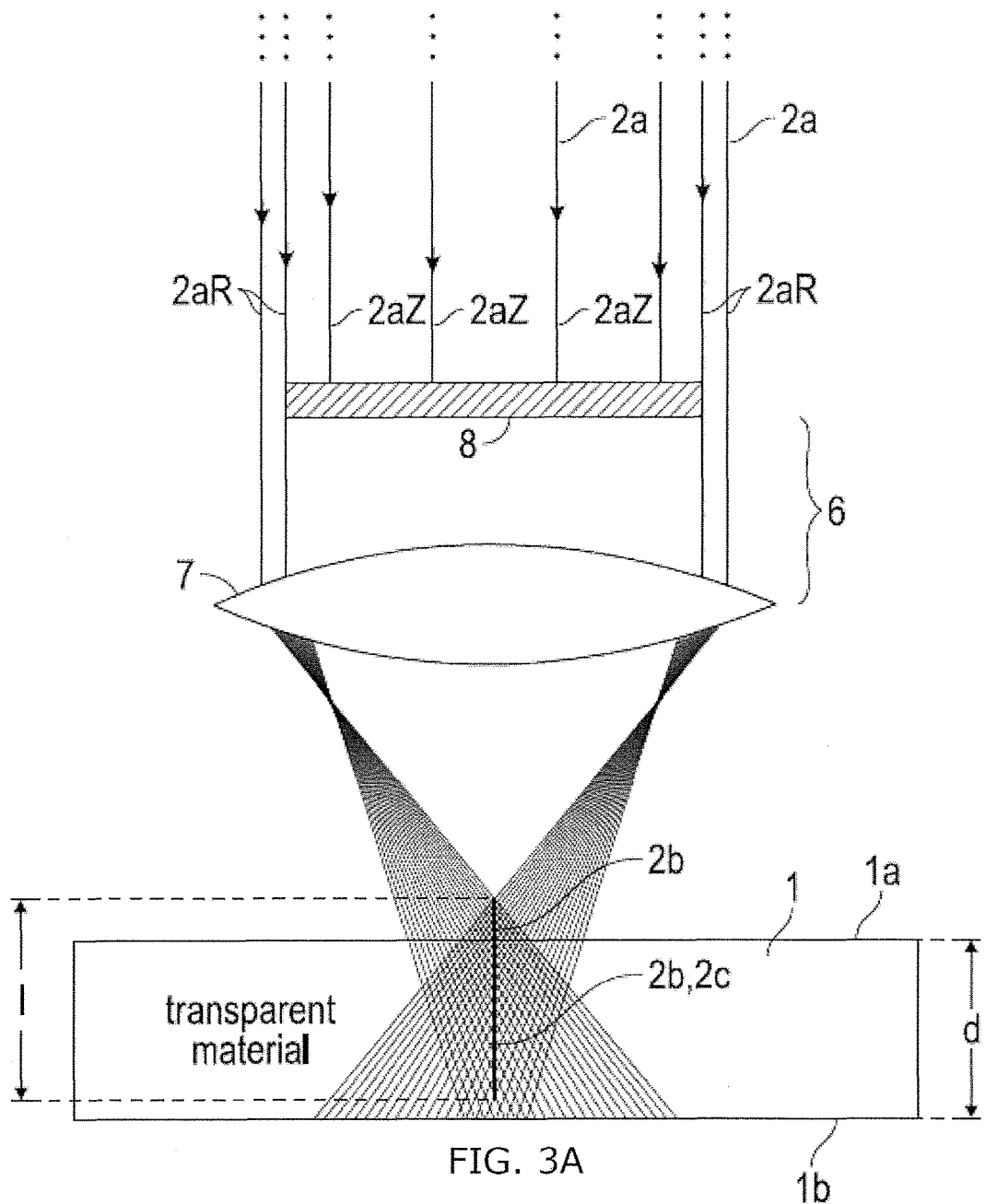
FIG. 3A is an illustration of an optical assembly for laser processing according to an embodiment.
Figures 1, 3B:
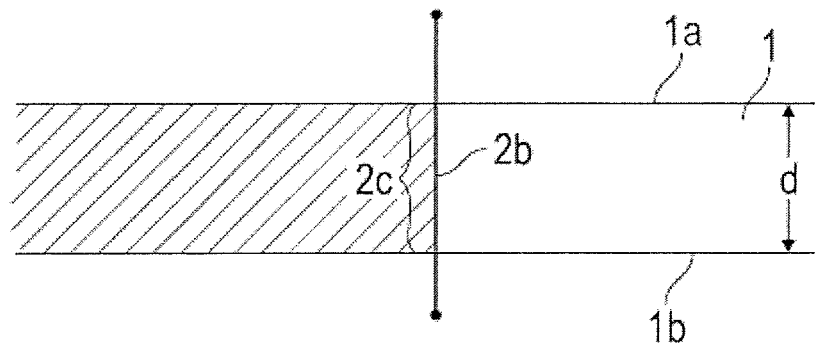

In the embodiment shown in FIG. 1, precise control of the depth of cut in a multilayer stack is achieved by inclusion of a beam disruption interface (labeled "modified interface"). The beam disruption interface prevents the laser radiation from interacting with portions of the multilayer stack beyond the position of the disruption interface.

In one embodiment, the beam disruption element is positioned immediately below the layer of the stack in which modification via two-photon absorption will occur. Such a configuration is shown in FIG. 1, where the beam disruption element is a modified interface positioned immediately below material A and material A is the material in which formation of perforations through the two-photon absorption mechanism described herein will occur. As used herein, reference to a position below or lower than another position assumes that the top or uppermost position is the surface of the multilayer stack upon which the laser beam is first incident. In FIG. 1, for example, the surface of material A that is closest to the laser source is the top surface and placement of the beam disruption element below material A means that the laser beam traverses material A before interacting with the beam disruption element.

The disruption element has different optical properties than the material to be cut. For example, the beam disruption element may be a defocusing element, a scattering element, a translucent element, or a reflective element. A defocusing element is an interface or a layer comprising a material that prevents the laser light from forming the laser beam focal line on or below the defocusing element. The defocusing element may be comprised of a material or interface with refractive index inhomogeneities that scatter or perturb the wavefront of the optical beam. A translucent element is an interface or layer of material that allows light to pass through, but only after scattering or attenuating the laser beam to lower the energy density sufficiently to prevent formation of a laser beam focal line in portions of the stack on the side of the translucent element that are remote from the laser beam. In one embodiment, the translucent element effects scattering or deviating of at least 10% of the light rays of the laser beam.

More specifically, the reflectivity, absorptivity, defocusing, attenuation, and/or scattering of the disruption element can be employed to create a barrier or impediment to the laser radiation. The laser beam disruption element can be created by several means. If the optical properties of the overall stack system are not of a concern, then one or more thin films can be deposited as a beam disruption layer(s) between the desired two layers of the stack, where the one or more thin films absorb, scatter, defocus, attenuate, reflects, and/or dissipates more of the laser radiation than the layer immediately above it to protect layers below the thin film(s) from receiving excessive energy density from the laser source. If the optical properties of the entire stack system do matter, the beam disruption element can be implemented as a notch filter. This can be done by several methods:

creating structures at the disruption layer or interface (e.g. via thin film growth, thin film patterning, or surface patterning) such that diffraction of incident laser radiation is at a particular wavelength or range of wavelengths occurs;

creating structures at the disruption layer or interface (e.g. via thin film growth, thin film patterning, or surface patterning) such that scattering of incident laser radiation occurs (e.g. a textured surface);

creating structures at the disruption layer or interface (e.g. via thin film growth, thin film patterning, or surface patterning) such that attenuated phase-shifting of laser radiation occurs; and creating a distributed Bragg reflector via thin-film stack at the disruption layer or interface to reflect only laser radiation.

It is not necessary that the absorption, reflection scattering, attenuation, defocusing etc. of the laser beam by the disruption element be complete. It is only necessary that the effect of the disruption element on the laser beam is sufficient to reduce the energy density or intensity of the focused laser beam to a level below the threshold required for cutting, ablation, perforating etc. of the layers in the stack protected by (underlying) the disruption element. In one embodiment, the disruption element reduces the energy density or intensity of the focused laser beam to a level below the threshold needed to induce two-photon absorption. The disruption layer or disruption interface may be configured to absorb, reflect, or scatter the laser beam, where the absorption, reflection, or scattering are sufficient to reduce the energy density or intensity of the laser beam transmitted to the carrier (or other underlying layer) to a level below the level needed to induce nonlinear absorption in the carrier or underlying layer.

Turning to FIGS. 2A and 2B, a method of laser drilling a material includes focusing a pulsed laser beam 2 into a laser beam focal line 2b, viewed along the beam propagation direction. Laser beam focal line 2b is a region of high energy density. As shown in FIG. 3, laser 3 (not shown) emits laser beam 2, which has a portion 2a incident to optical assembly 6. The optical assembly 6 turns the incident laser beam into an extensive laser beam focal line 2b on the output side over a defined expansion range along the beam direction (length 1 of the focal line).

Layer 1 is the layer of a multilayer stack in which internal modifications by laser processing and two-photon absorption is to occur. Layer 1 is a component of a larger workpiece, which typically includes a substrate or carrier upon which a multilayer stack is formed. Layer 1 is the layer within the multilayer stack in which holes, cuts, or other features are to be formed through two-photon absorption assisted ablation or modification as described herein. The layer 1 is positioned in the beam path to at least partially overlap the laser beam focal line 2b of laser beam 2. Reference 1a designates the surface of the layer 1 facing (closest or proximate to) the optical assembly 6 or the laser, respectively, reference 1b designates the reverse surface of layer 1 (the surface remote, or further away from, optical assembly 6 or the laser). The thickness of the layer 1 (measured perpendicularly to the planes 1a and 1b, i.e., to the substrate plane) is labeled with d.

As FIG. 2A depicts, layer 1 is aligned perpendicular to the longitudinal beam axis and thus behind the same focal line 2b produced by the optical assembly 6 (the substrate is perpendicular to the plane of the drawing). Viewed along the beam direction, the layer 1 is positioned relative to the focal line 2b in such a way that the focal line 2b (viewed in the direction of the beam) starts before the surface 1a of the layer 1 and stops before the surface 1b of the layer 1, i.e. focal line 2b terminates within the layer 1 and does not extend beyond surface 1b. In the overlapping area of the laser beam focal line 2b with layer 1, i.e. in the portion of layer 1 overlapped by focal line 2b, the extensive laser beam focal line 2b generates nonlinear absorption in layer 1. (Assuming suitable laser intensity along the laser beam focal line 2b, which intensity is ensured by adequate focusing of laser beam 2 on a section of length 1 (i.e. a line focus of length 1), which defines an extensive section 2c (aligned along the longitudinal beam direction) along which an induced nonlinear absorption is generated in the layer 1.) The induced nonlinear absorption results in formation of a defect line or crack in layer 1 along section 2c. The defect or crack formation is not only local, but rather may extend over the entire length of the extensive section 2c of the induced absorption. The length of section 2c (which corresponds to the length of the overlapping of laser beam focal line 2b with layer 1) is labeled with reference L. The average diameter or extent of the section of the induced absorption 2c (or the sections in the material of layer 1 undergoing the defect line or crack formation) is labeled with reference D. This average extent D basically corresponds to the average diameter 6 of the laser beam focal line 2b, that is, an average spot diameter in a range of between about 0.1 µm and about 5 µm.

As FIG. 2A shows, the layer 1 (which is transparent to the wavelength λ of laser beam 2) is locally heated due to the induced absorption along the focal line 2b. The induced absorption arises from the nonlinear effects associated with the high intensity (energy density) of the laser beam within focal line 2b. FIG. 2B illustrates that the heated layer 1 will eventually expand so that a corresponding induced tension leads to micro-crack formation, with the tension being the highest at surface 1a.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To insure high quality (regarding breaking strength, geometric precision, roughness and avoidance of re-machining requirements) of the surface of separation after cracking along the contour defined by the series of perforations, the individual focal lines used to form the perforations that define the contour of cracking should be generated using the optical assembly described below (hereinafter, the optical assembly is alternatively also referred to as laser optics). The roughness of the separated surface is determined primarily by the spot size or the spot diameter of the focal line. A roughness of a surface can be characterized, for example, by an Ra surface roughness statistic (roughness arithmetic average of absolute values of the heights of the sampled surface). In order to achieve a small spot size of, for example, 0.5 µm to 2 µm in case of a given wavelength λ of laser 3 (interaction with the material of layer 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbé formulae (N.A.=n sin (theta), n: refractive index of the material to be processed, theta: half the aperture angle; and theta=arctan (D/2f); D: aperture, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the layer 1, i.e. incidence angle β is 0° so that the focal line 2b or the extensive section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely blocked by it. Only the beams in the outer perimeter range of beam bundle 2a (marginal rays, here labeled with 2aR) are not blocked due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to 1/e of the peak intensity) and approximately 75% of the diameter of the lens of the optical assembly 6. The focal line 2b of a non-aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the material to be processed in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 2, 3B:
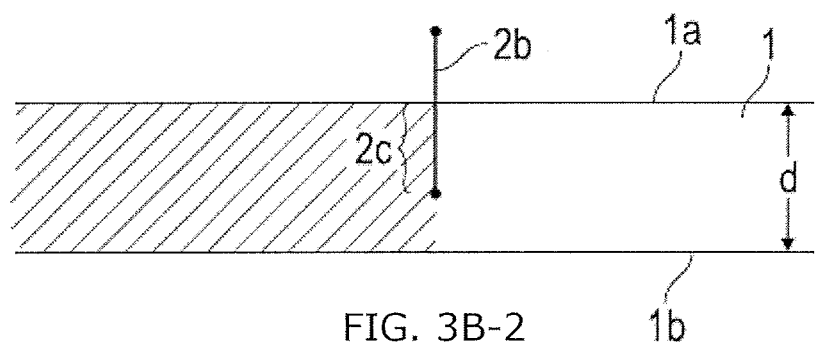
Figures 3, 3B:
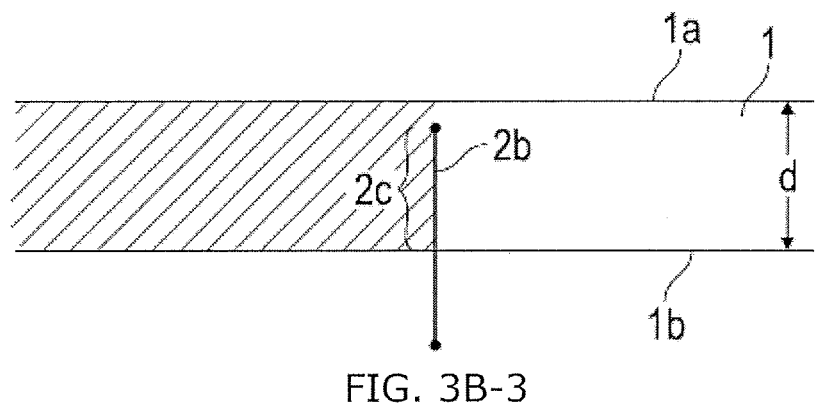
Figures 3, 3B, 4:
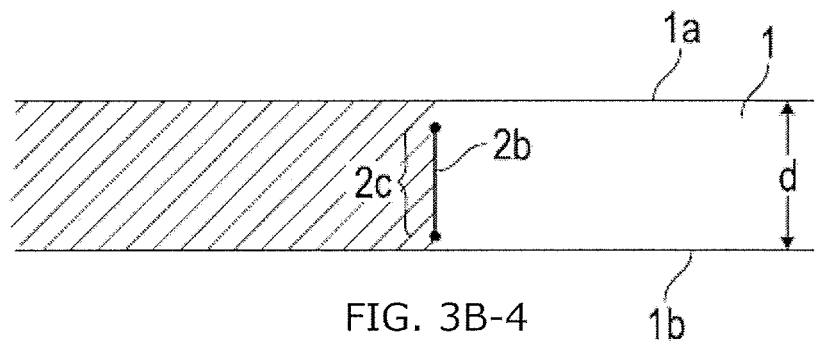
Figure 4:
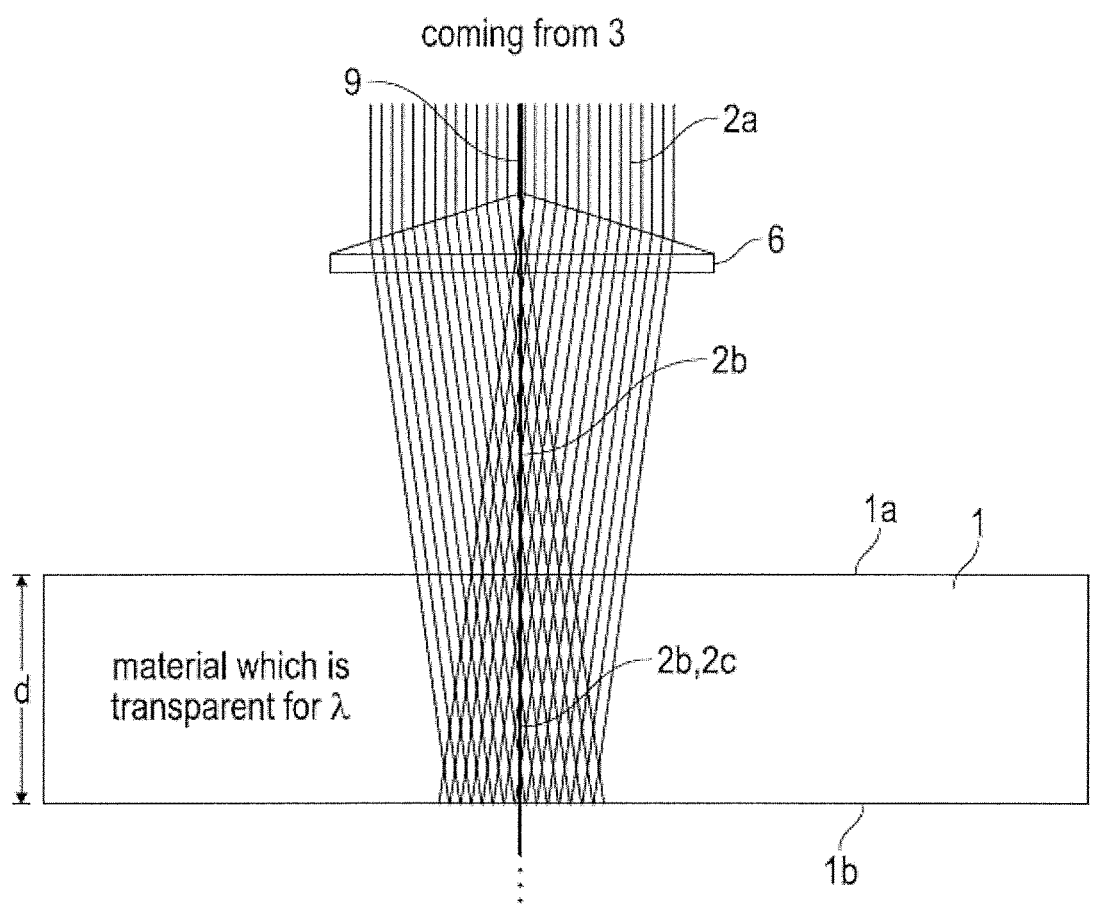

FIG. 3B-1-4 show (not only for the optical assembly in FIG. 3A, but also for any other applicable optical assembly 6) that the position of laser beam focal line 2b can be controlled by suitably positioning and/or aligning the optical assembly 6 relative to layer 1 as well as by suitably selecting the parameters of the optical assembly 6: As FIG. 3B-1 illustrates, the length 1 of the focal line 2b can be adjusted in such a way that it exceeds the layer thickness d (here by factor 2). If layer 1 is placed (viewed in longitudinal beam direction) centrally to focal line 2b, an extensive section of induced absorption 2c is generated over the entire substrate thickness.

In the case shown in FIG. 3B-2, a focal line 2b of length 1 is generated which corresponds more or less to the layer thickness d. Since layer 1 is positioned relative to line 2b in such a way that line 2b starts at a point outside the material to be processed, the length L of the section of extensive induced absorption 2c (which extends here from the substrate surface to a defined substrate depth, but not to the reverse surface 1b) is smaller than the length 1 of focal line 2b. FIG. 3B-3 shows the case in which the substrate 1 (viewed along the beam direction) is positioned above the starting point of focal line 2b so that, as in FIG. 3B-2, the length 1 of line 2b is greater than the length L of the section of induced absorption 2c in layer 1. The focal line thus starts within the layer 1 and extends beyond the reverse surface 1b. FIG. 3B-4 shows the case in which the focal line length 1 is smaller than the layer thickness d so that—in the case of a central positioning of the substrate relative to the focal line viewed in the direction of incidence—the focal line starts near the surface 1a within the layer 1 and ends near the surface 1b within the layer 1 (e.g. 1=0.75·d). The laser beam focal line 2b can have a length 1 in a range of between about 0.1 mm and about 100 mm or in a range of between about 0.1 mm and about 10 mm, for example. Various embodiments can be configured to have length 1 of about 0.1 mm, 0.2 mm, 0.3 mm, 0.4 mm, 0.5 mm, 0.7 mm, 1 mm, 2 mm, 3 mm or 5 mm, for example.

It is particularly advantageous to position the focal line 2b in such a way that at least one of surfaces 1a, 1b is covered by the focal line, so that the section of induced nonlinear absorption 2c starts at least on one surface of the layer or material to be processed. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length 1 is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is principally known to those of skill in the art; the cone angle in the example is 10°. The apex of the axicon labeled here with reference 9 is directed towards the incidence direction and centered on the beam center. Since the focal line 2b produced by the axicon 9 starts within its interior, layer 1 (here aligned perpendicularly to the main beam axis) can be positioned in the beam path directly behind axicon 9. As FIG. 4 shows, it is also possible to shift layer 1 along the beam direction due to the optical characteristics of the axicon while remaining within the range of focal line 2b. The section of extensive induced absorption 2c in the material of layer 1 therefore extends over the entire depth d.

However, the depicted layout is subject to the following restrictions: Since the region of focal line 2b formed by axicon 9 begins within the axicon 9, a significant part of the laser energy is not focused into the section of induced absorption 2c of focal line 2b, which is located within the material, in the situation where there is a separation between axicon 9 and the material to be processed. Furthermore, length 1 of focal line 2b is related to the beam diameter through the refractive indices and cone angles of axicon 9. This is why, in the case of relatively thin materials (several millimeters), the total focal line is much longer than the thickness of the material to be processed, having the effect that much of the laser energy is not focused into the material.

Figure 5A:
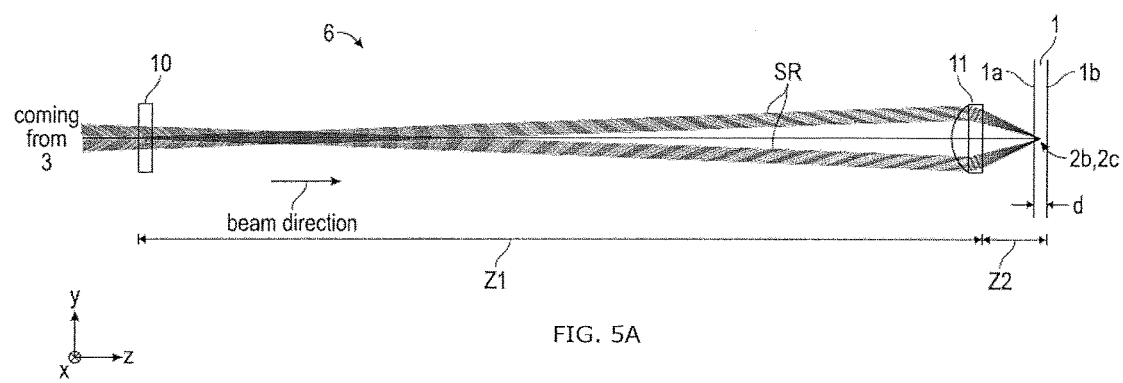
FIGS. 5A and 5B are illustrations of a third optical assembly for laser drilling according to an embodiment.

For this reason, it may be desirable to use an optical assembly 6 that includes both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 5B:
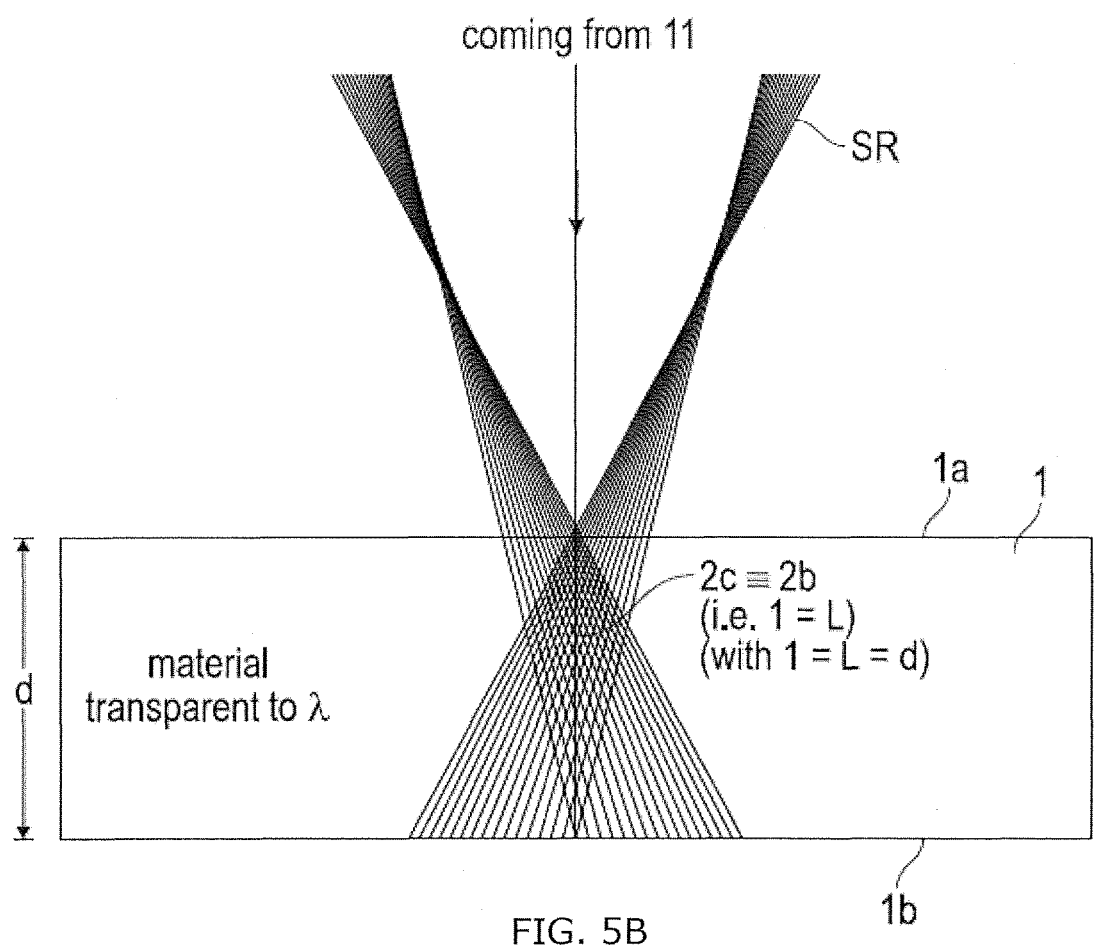

FIG. 5B depicts the formation of the focal line 2b or the induced absorption 2c in the material of layer 1 according to FIG. 5A in detail. The optical characteristics of both elements 10, 11 as well as the positioning of them is selected in such a way that the length 1 of the focal line 2b in beam direction is exactly identical with the thickness d of layer 1. Consequently, an exact positioning of layer 1 along the beam direction is required in order to position the focal line 2b exactly between the two surfaces 1a and 1b of layer 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length 1 of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack formation is intended to continue to the back side of the layer or material to be processed, the circular (annular) illumination still has the advantage that (1) the laser power is used optimally in the sense that most of the laser light remains concentrated in the required length of the focal line, and (2) it is possible to achieve a uniform spot size along the focal line—and thus a uniform separation process along the perforations produced by the focal lines—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
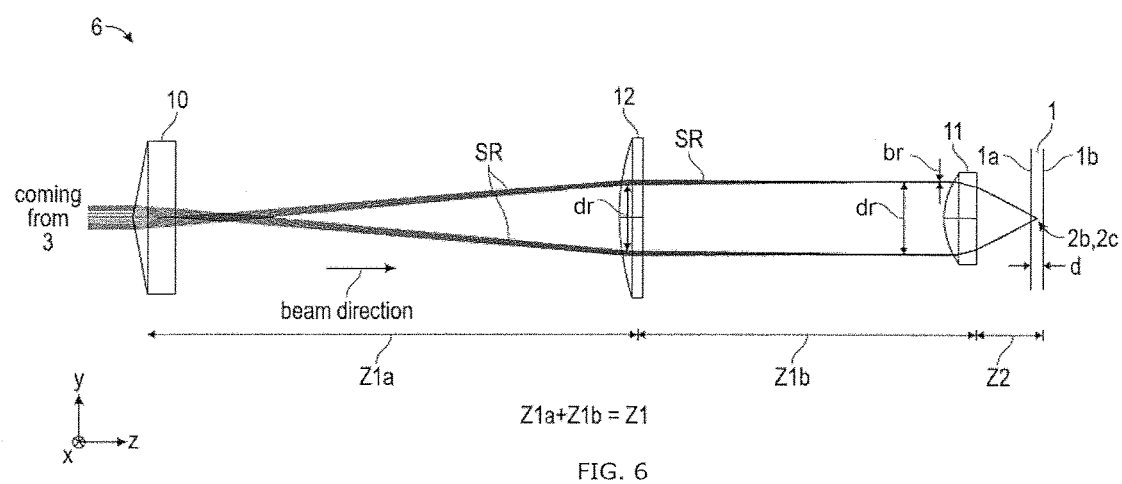
FIG. 6 is a schematic illustration of a fourth optical assembly for laser processing according to an embodiment.

As shown in FIG. 6, both effects can be avoided by including another lens, a collimating lens 12 in the optical assembly 6. The additional positive lens 12 serves to adjust the circular illumination of focusing lens 11 very tightly. The focal length f of collimating lens 12 is selected in such a way that the desired circle diameter dr results from distance z1a from the axicon to the collimating lens 12, which is equal to f. The desired width br of the ring can be adjusted via the distance z1b (collimating lens 12 to focusing lens 11). As a matter of pure geometry, the small width of the circular illumination leads to a short focal line. A minimum can be achieved at distance f.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction). As shown in FIG. 6, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approx. 4 mm at lens 12 is reduced to approx. 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

Figure 7:
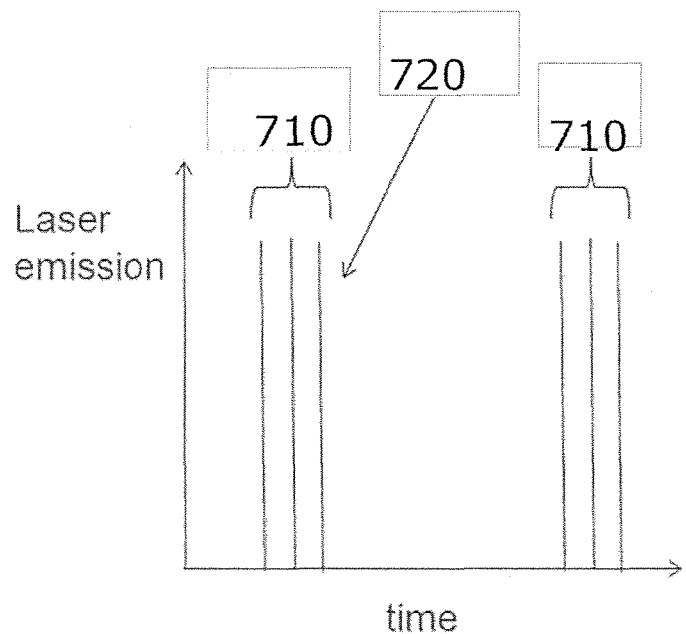
FIG. 7 is a graph of laser emission as a function of time for a picosecond laser according to an embodiment, where each emission is characterized by a pulse "burst" which may contain one or more sub-pulses, the frequency of the bursts is the repetition rate of the laser, typically about 100 kHz (10 μsec), and the time between sub-pulses is much shorter, e.g., about 20 nanoseconds (nsec)

Note that, as shown in FIG. 7, the typical operation of such a picosecond laser creates a "burst" 710 of pulses 720. Each "burst" 710 may contain multiple pulses 720 (such as at least 2 pulses, or at least 3 pulses as shown in FIG. 7, for example 4 pulses, 5 pulses or more) of very short duration (about 10 psec). (Bursting or producing pulse bursts is a type of laser operation where the emission of pulses is not in a uniform and steady stream but rather in tight clusters of pulses.) Pulses 720 typically have a pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). Preferably, each pulse 720, within a burst, is separated in time by a duration by a duration $T_p$ that is within a range of between about 1 nsec and about 50 nsec, for example. 10-50 nsec, or 10-30 nsec, with the time often governed by the laser cavity design). For a given laser, the time separation $T_p$ between adjacent pulses (pulse-to-pulse separation) within a burst 710 can be relatively uniform (AO %). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each "burst" 710 will be much longer, (e.g., $0.25 \leq T_b \leq 1000$ microseconds, for example 1-10 microseconds, or 3-8 microseconds), often about 10 μsec, for a laser repetition rate of about 100 kHz. The exact timings, pulse durations, and repetition rates can vary depending on the laser design, but short pulses (i.e., less than about 15 psec) of high intensity have been shown to work well with this technique.

In some of the exemplary embodiments of the laser described herein the time separation $T_b$ is around 5 microseconds for a laser with burst repetition rate or frequency of about 200 kHz. The laser burst repetition rate is relates to the time $T_b$ between the first pulse in a burst to the first pulse in the subsequent burst (laser burst repetition rate=$1/T_b$). In some embodiments, the laser burst repetition frequency may be in a range of between about 1 kHz and about 4 MHz. In another embodiment, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 k Hz burst repetition rate). The exact timings, pulse durations, and burst repetition rates can vary depending on the laser design, but short pulses ($T_d$<20 psec and preferably $T_d \leq 15$ psec) of high intensity have been shown to work particularly well.

The use of a laser capable of generating such pulse bursts is advantageous for cutting or modifying transparent materials, for example glass. In contrast with the use of single pulses spaced apart in time by the repetition rate of the single-pulsed laser, the use of a pulse burst sequence that spreads the laser energy over a rapid sequence of pulses within the burst 710 allows access to larger timescales of high intensity interaction with the material than is possible with single-pulse lasers. While a single-pulse can be expanded in time, as this is done the intensity within the pulse must drop as roughly one over the pulse width. Hence if the pulse length of a 10 psec single pulse is increased to a 10 nsec, the intensity will drop by roughly three orders of magnitude. Such a reduction can reduce the optical intensity to the point where non-linear absorption is no longer significant, and light/material interaction is no longer strong enough to cut the material. In contrast, with a pulse burst laser, the intensity during each pulse 720 within the burst 710 can remain very high—for example three 10 psec pulses 720 spaced apart in time by approximately 10 nsec still allows the intensity within each pulse to be approximately three times higher than that of a single 10 psec pulse, while the laser is allowed to interact with the material over a timescale that is now three orders of magnitude larger. This adjustment of multiple pulses 720 within a burst 710 thus allows manipulation of timescale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the line focus used to interact with the substrate. The longer the interaction region, the more the energy is spread out, and higher burst energy will be required. The exact timings, pulse durations, and burst repetition rates can vary depending on the laser design, but short pulses (<15 psec, or ≤10 psec) of high intensity have been shown to work well with this technique. A defect line or a hole is formed in the material when a single burst of pulses strikes essentially the same location on the glass. That is, multiple laser pulses within a single burst correspond to a single defect line or a hole location in the glass. Of course, since the glass is translated (for example by a constantly moving stage) (or the beam is moved relative to the glass, the individual pulses within the burst cannot be at exactly the same spatial location on the glass. However, they are well within 1 μm of one another—i.e., they strike the glass at essentially the same location. For example, they may strike the glass at a spacing, sp, from one another where 0<sp≤500 nm. For example, when a glass location is hit with a burst 710 of 20 pulses 720, the individual pulses 720 within the burst 710 strike the glass within 250 nm of each other. Thus, in some embodiments 1 nm<sp<250 nm. In some embodiments 1 nm<sp<100 nm.

Figure 8:
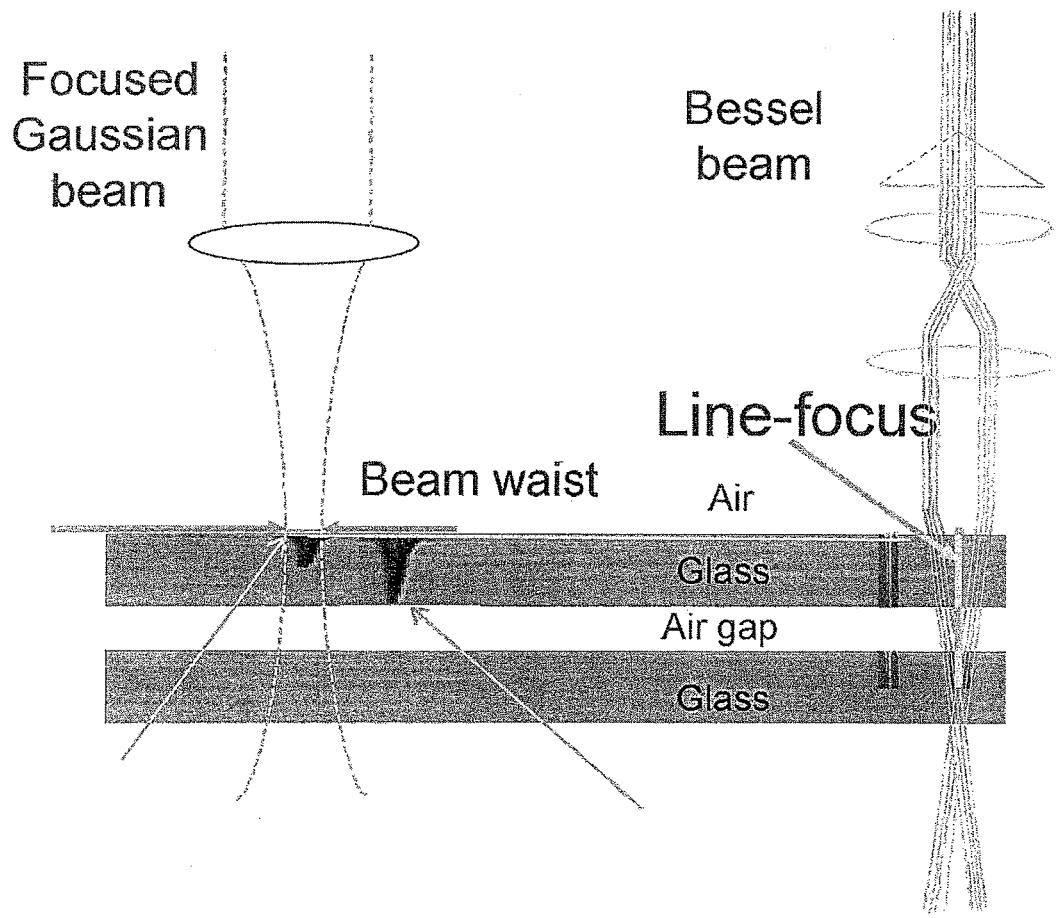
FIG. 8 is a comparison between a focused Gaussian beam and a Bessel beam incident upon a glass-air-glass composite structure.

FIG. 8 shows the contrast between a focused Gaussian beam and a Bessel beam incident upon a glass-air-glass composite structure. (The Gaussian beam is shown at the left and the Bessel beam is shown at the right in FIG. 8). The focused Gaussian beam is shown to diverge upon entering the first glass layer and does not drill through the first glass layer. In the second example, shown to the right of the Gaussian beam, the first glass layer is bifurcated as a result of the occurrence of self-focusing. When self-focusing occurs (as the glass is being drilled), the beam emerges from the first glass layer and diffracts. As a result, the beam will not drill into the second glass layer. Moving further to the right in FIG. 8, the Bessel beam is well able to drill both glass layers over the full extent of the line focus. In this example, the substrate is a glass-air-glass composite structure. The top and bottom glass pieces are 0.4 mm thick 2320, CT101. The exemplary air gap between two layers of glass is ~400 μm. The cut was made with a single pass of the laser at 200 mm/sec, so that the two pieces of glass were cut simultaneously, even though they were separated by >400 μm.

In some of the embodiments described herein, the air gap may be any suitable distance such as, for example, between 50 μm and 5 mm, between 50 μm and 2 mm, or between 200 μm and 2 mm.

Figure 9:
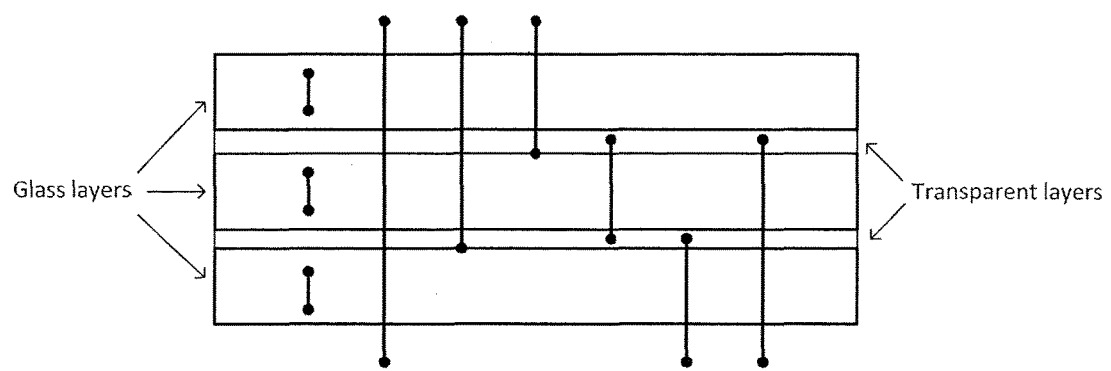
FIG. 9 is an illustration of stacking with transparent protective layers to cut multiple sheets while reducing abrasion or contamination according to an embodiment.

Exemplary disruption layers include polyethylene plastic sheeting (e.g., Visqueen). Transparent layers, as shown in FIG. 9, include transparent vinyl (e.g., Penstick). Note that unlike with other focused laser methods, to get the effect of a blocking or stop layer, the exact focus does not need to be precisely controlled, nor does the material of the disruption layer need to be particularly durable or expensive. In many applications, a layer need only slightly interfere with the laser light to disrupt the laser light and prevent line focus from occurring. The fact that Visqueen prevents cutting with the picosecond laser and line focus is a perfect example—other focused picosecond laser beams will most certainly drill right through the Visqueen, and one wishing to avoid drilling right through such a material with other laser methods one would have to very precisely set the laser focus to not be near the Visqueen.

Figure 10:
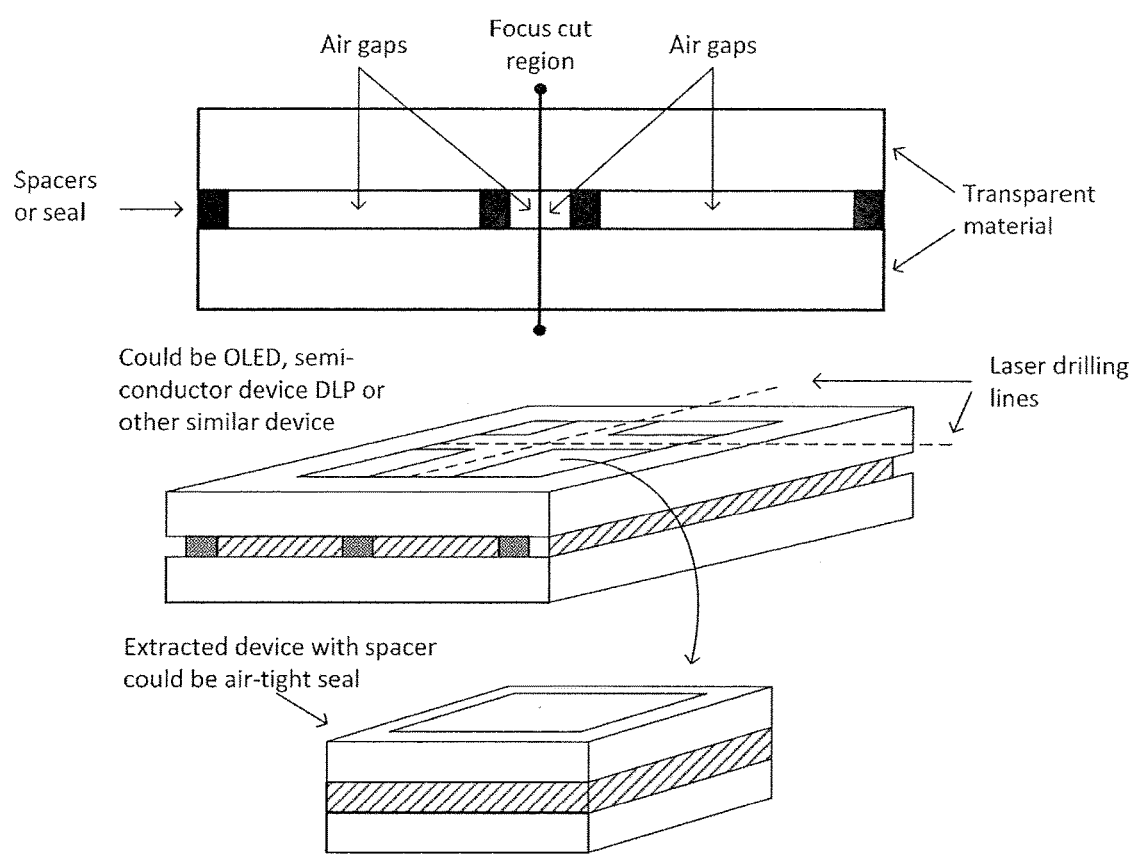
FIG. 10 is an illustration of an air gap and cutting of encapsulated devices according to an embodiment.
Figure 11:
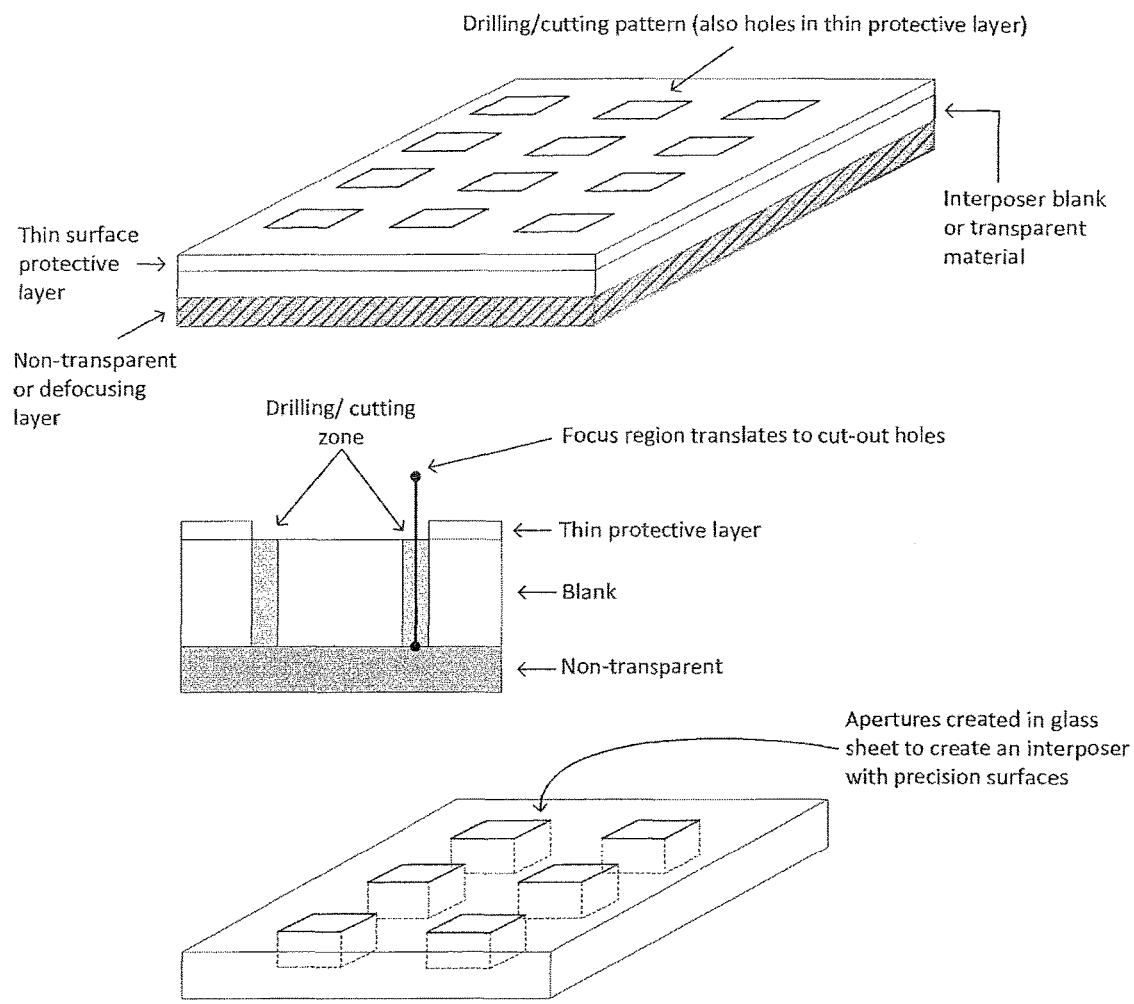
FIG. 11 is an illustration of cutting of interposers or windows with laser perforation then etch or laser perforation and $CO_2$ laser release according to an embodiment.

FIG. 10 shows stacking with transparent protective layers to cut multiple sheets while reducing abrasion or contamination. Simultaneously cutting a stack of display glass sheets is very advantageous. A transparent polymer such as vinyl can be placed between the glass sheets. The transparent polymer layers are protective layers that serve to reduce damage to the glass surfaces which are in close contact with one another. These layers would allow the cutting process to work, but would protect the glass sheets from scratching one another, and would also prevent any cutting debris (albeit it is small with this process) from contaminating the glass surfaces. The protective layers can also be comprised of evaporated dielectric layers deposited on the substrates or glass sheets, In reference to FIG. 11, illustrates a method of cutting a pattern of cut-out holes in a stacked assembly. This line focus process can simultaneously cut through stacked glass sheets, even if a significant macroscopic air gap is present. This is not possible with other laser methods (See, e.g., the Gaussian beam illustrated in FIG. 8). Many devices require glass encapsulation, such as OLEDs (organic light emitting diodes). Being able to simultaneously cut through two glass layers is very advantageous because it provides a reliable and efficient device segmentation process. Segmentation refers to a process that separates one component from a larger sheet of material that may contain a plurality of other components. Other components that can be segmented, cut out, or produced by the methods described herein are, for example, OLED (organic light emitting diode) components, DLP (digital light processor) components, an LCD (liquid crystal display) cells, semiconductor device substrates.

Figure 12:
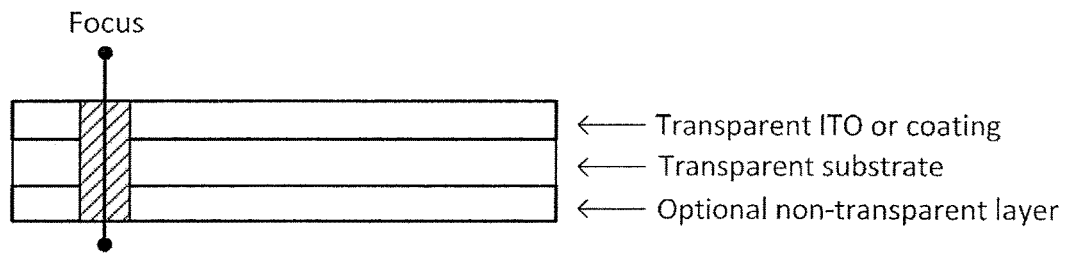
FIG. 12 is an illustration of cutting an article such as electrochromic glass coated with transparent conductive layers (e.g. indium tin oxide (ITO)) according to an embodiment.

Referring to FIG. 12, a process for cutting an article such as electrochromic glass coated with transparent conductive layers (e.g. ITO) is illustrated. Cutting glass that already has transparent conducting layers such as indium tin oxide (ITO) is of high value for electrochromic glass applications and for touch panel device applications. The laser processes described herein can cut through such layers with minimal damage to the transparent conductive layer and with very little debris generation. The extremely small size of the perforated holes (<5 um) means that very little of the ITO will be affected by the cutting process, whereas other cutting methods are going to generate far more surface damage and debris.

Figure 13:
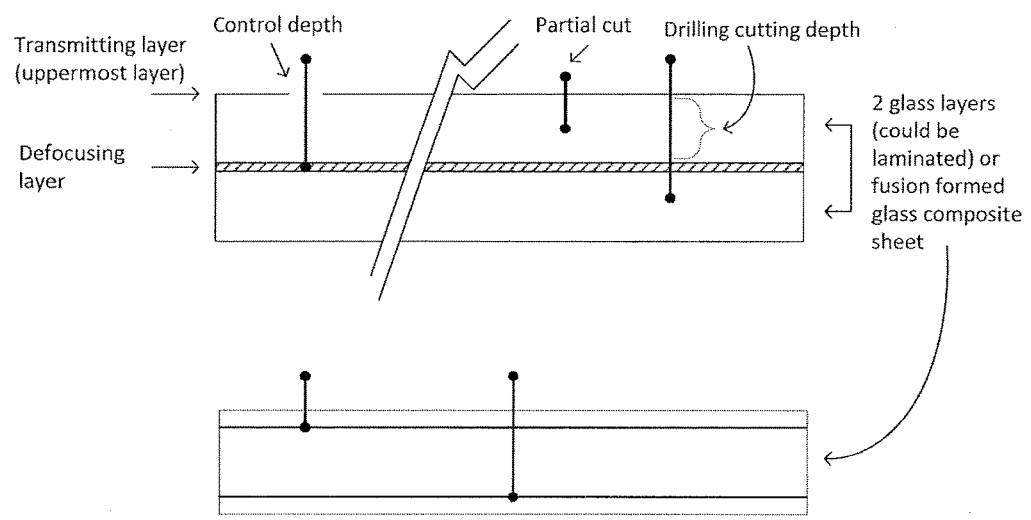
FIG. 13 is an illustration of precision cutting of some layers in a stack while not damaging others according to an embodiment.

Referring to FIG. 13, a method for precision cutting of some layers in a stack while not damaging others is disclosed. While this method is also shown in FIG. 1, the embodiment of FIG. 13 extends the concept to multiple layers (i.e., more than two layers). In the embodiment of FIG. 13, the disruption element is a defocusing layer.

Figure 14A:
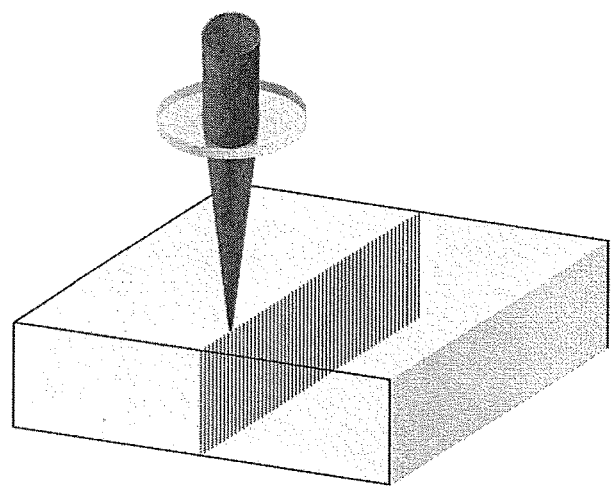
FIGS. 14A-14C are schematic views of a laser creating a fault line through a substrate, a substrate edge with a defect after separation, and a picture of a separated edge of a substrate.
Figure 14B:
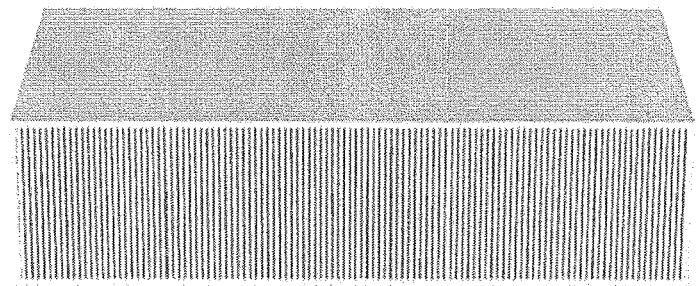
Figure 14C:
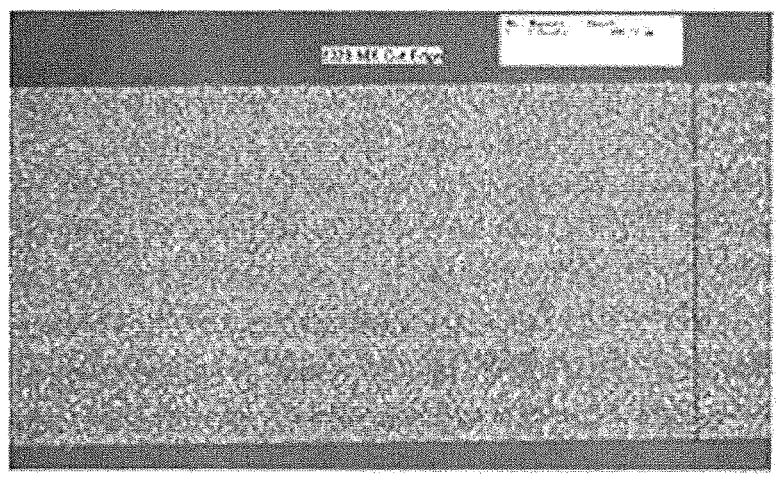
Figure 15A:
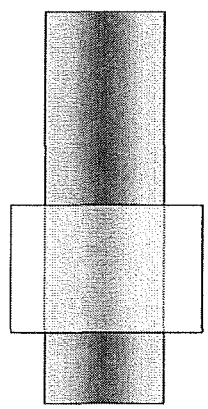
FIGS. 15A-15C are schematic views of different regimes for laser processing of materials.
Figure 15B:
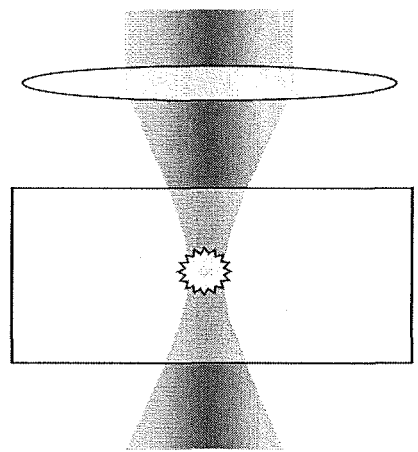
Figure 15C:
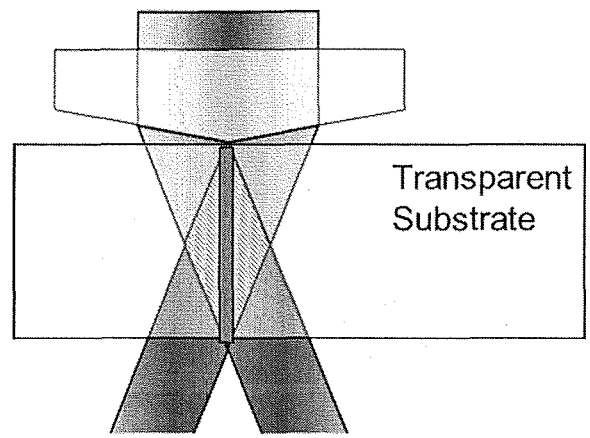

In sum and in general, then, the cutting mechanism is essentially as shown in FIG. 14A, and the method to cut and separate transparent substrates is essentially based on creating a fault line on the substrate to be processed with an ultra-short pulsed laser. Depending on the material properties (absorption, CTE, stress, composition, etc.) and laser parameters chosen for processing the determined substrate, the creation of a fault line alone is enough to induce self-separation, and in this case, no secondary processes, such as bending/tension forces or CO2 laser, are necessary.

In some cases, however, the created fault line is not enough to separate the substrate automatically and a secondary step may be necessary. If so, a second laser can be used to create thermal stress to separate it, for example. In the specific and exemplar case of 2320 NIOX, it has been found that separation can be achieved, after the creation of a defect line, by application of mechanical force or by using a second $CO_2$ laser to create thermal stress and force the parts to self separate. Another option is to have the $CO_2$ laser only start the separation and finish the separation manually. The optional $CO_2$ laser separation is achieved with a focused cw laser emitting at 10.6 nm and with power adjusted by controlling its duty cycle. Focus change is used to vary the induced thermal stress by varying the spot size.

There are several methods to create that defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (1R, green, UV, etc.) can also be varied, as long as sufficient optical intensities are reached to create breakdown of the substrate material.

In experimenting with the present invention, an ultra-short pulsed laser was used to create this high aspect ratio vertical defect line in a consistent, controllable and repeatable manner. The essence of this concept, as described above, is to use an axicon lens element in an optical lens assembly to create a region of high aspect ratio taper-free microchannel using ultra-short (picoseconds or femtosecond duration) Bessel beams. In other words, the axicon condense the laser beam into a region of cylindrical shape and high aspect ratio (long length and small diameter). Due to the high intensity created with the condensed laser beam, non-linear interaction of the laser electromagnetic field and the material occurs and the laser energy is transferred to the substrate. However, it is important to realize that in the areas where the laser energy intensity is not high (i.e., glass surface, glass volume surrounding the central convergence line), nothing happens to the glass as the laser intensity is below the nonlinear threshold.

FIGS. 2A-2C illustrate the laser-matter interaction at different laser intensity regimes. In the first case, the unfocused laser beam goes through a transparent substrate without introducing any modification to it. In this particular case, the nonlinear effect is not present because the laser energy density (or laser energy per units of area illuminated by the beam) is below the threshold necessary to induce nonlinear effects. The higher the energy density, the higher is the intensity of the electromagnetic field. So, when the laser beam is focused to a smaller spot size, the illuminated area is reduced and the energy density increases triggering the nonlinear effect that will modify the material in the volume only where that condition is satisfied. In this way, if the beam waist of the focused laser is positioned at the surface of the substrate that is where the damage will occur. In contrast, if the beam waist of the focused laser is positioned below the surface of the substrate, nothing happens at the surface because the energy density is below the threshold of the nonlinear optical effect. But at the focus, positioned in the bulk of the substrate, the laser intensity is enough to trigger the multi-photon effect and induce damage to the material. Finally, in the case of an axicon, the diffraction pattern of an axicon lens, or alternatively a Fresnel axicon, creates interference that generates a Bessel-shaped intensity distribution (cylinder of high intensity) and only in that volume there is enough intensity to create nonlinear absorption and modification to the material.

Laser and Optical System

For the purpose of cutting glass a process was developed that uses a 1064 nm picosecond laser in combination with line-focus beam forming optics to create lines of damage in the substrates. The glass substrate with 0.7 mm thickness is positioned so that it is within the line-focus. With a line-focus of ~1 mm extent, and a picosecond laser that produces output power of at least 24 W at a repetition rate of 200 kHz (about 100μ/pulse), then the optical intensities in the line region can easily be high enough to create non-linear absorption in the material. A region of damaged, ablated, vaporized, or otherwise modified material is created that approximately follows the linear region of high intensity.

It is worth noting that the typical operation of such a picosecond laser creates a "burst" of pulses. Each "burst" may contain multiple sub-pulses of very short duration (~10 psec). Each sub-pulse is separated in time by approximately 20 nsec (50 MHz), with the time often governed by the laser cavity design. The time between each "burst" will be much longer, often about 5 μsec, for a laser repetition rate of about 200 kHz. The exact timings, pulse durations, and repetition rates can vary depending on the laser design. But short pulses (<15 psec) of high intensity have been shown to work well with this technique.

Hole or Damage Track Formation

If the substrate has sufficient stress (e.g. with ion exchanged glass), then the part will spontaneously crack and separate along the path of perforated damage traced out by the laser process. However, if there is not a lot of stress inherent to the substrate, then the picosecond laser will simply form damage tracks in the piece. These damage tracks generally take the form of holes with interior dimensions ~0.5-1.5 um.

The holes can perforate the entire thickness of the material, and may or may not be a continuous opening throughout the depth of the material. The perforations or damage tracks are observable through the side of a cleaved edge. The tracks through the material are not necessarily through holes—there are often regions of glass that plug the holes, but they are generally small in size, nanometers or microns in cross-section.

It is also possible to perforate stacked sheets of glass. In this case the defect line length needs to be longer than the stack height.

The lateral spacing (pitch) between these holes is determined by the pulse rate of the laser as the substrate is translated underneath the focused laser beam. Only a single picosecond laser pulse burst is necessary to form an entire hole, although multiple pulses may be used if desired. To form holes at different pitches, the laser can be triggered to fire at longer or shorter intervals. For cutting operations, the laser triggering generally is synchronized with the stage driven motion of the part beneath the beam, so laser pulses are triggered at a fixed interval, such as every 1 um, or every 5 um. The exact spacing is determined by the material properties that facilitate crack propagation from perforated hole to perforated hole, given the stress level in the substrate.

However, in contrast to cutting a substrate, it is also possible to use the same method to only perforate the material. In this case, the holes are separated 7 μm pitch.

The laser power and lens focal length (which determines the defect line length and hence power density) are particularly critical parameters to ensure full penetration of the glass and low micro-cracking.

In general, across a variety of glass and other transparent materials, applicants discovered that laser powers between 10 and 100 W are preferred to achieve cutting speeds from 0.2-10 m/sec, with laser powers of 25-60 Watts being sufficient (and optimum) for many glasses. For cutting speeds of 0.4 m to 5 m/sec, laser powers should preferably be 10 W-150 W, with burst energy of 40-750 μJ/burst, 2-25 bursts per pulse (depending on the material that is cut), and hole separation (or pitch) of 2 to 25 μm, or 3-15 μm. The use of picosecond pulse burst lasers would be preferable for these cutting speeds because they generate high power and the required number of pulses per burst. Thus, according to some exemplary embodiments, the pulsed laser produces 10-100 W of power, for example 25 W to 60 Watts, and produces pulse bursts at least 2-25 pulses per burst and the distance between the defect lines is 2-15 microns (e.g., 2-10 microns); and the laser beam and/or workpiece (e.g., the substrate, for example a glass substrate) are translated relative to one another at a rate of at least 0.25 m/sec, in some embodiments at least 0.4 m/sec, for example 0.5 m/sec to 5 m/sec, 6 m/sec, 7 m/sec, or faster.

Accordingly, it is preferable that the laser produces pulse bursts with at least 2 pulses per burst. For example, in some embodiments the pulsed laser has laser power of 10 W-150 W (e.g., 10-100 W) and produces pulse bursts with at least 2 pulses per burst (e.g., 2-25 pulses per burst). In some embodiments the pulsed laser has the power of 25 W-60 W, and produces pulse bursts with at least 2-25 pulses per burst, and periodicity or distance between the adjacent defect lines produced by the laser bursts is 2-10 microns. In some embodiments the pulsed laser has laser power of 10 W-100 W, produces pulse bursts with at least 2 pulses per burst, and the workpiece (substrate) and the laser beam are translated relative to one another at a rate of at least 0.25 m/sec. In some embodiments the workpiece (substrate) and/or the laser beam are translated relative to one another at a rate of at least 0.4 m/sec.

According to some of the embodiments described herein volumetric pulse energy density ($\mu J/\mu m^3$) is required for perforating some glass materials is 0.005-0.5 $\mu J/\mu m^3$. According to some of the embodiments described herein volumetric pulse energy density ($\mu J/\mu m^3$) is required for perforating some lass materials is 0.005 $\mu J/\mu m^3$ to ~0.1 $\mu J/\mu m^3$ (e.g., Corning Gorilla®) is 0.01 $\mu J/\mu m^3$-0.1 $\mu J/\mu m^3$. For other materials (for example, alkaline earth boro-aluminosilicate glasses with low or no alkali containing glasses it may be much higher about 0.05 $\mu J/\mu m^3$ or higher, for some embodiments, at least 0.1 $\mu J/\mu m^3$, for example 0.1 $\mu J/\mu m^3$-0.5 $\mu J/\mu m^3$.

Cutting and Separating Shapes of a Plate:

Through experiments undertaken by applicant, different conditions have been found that allow the separation of sapphire (linear cuts or shapes). The first method is to use the picosecond laser only to create through holes and forming a fault line following the desired shape. After this step, mechanical separation can be accomplished by using a breaking plier, manually bending the part, or any method that create tension that initiate and propagate the separation along the fault line. It was determined that picosecond and $CO_2$ laser parameters required fabrication at the perimeter cut & to create through holes in 700 µm thick material and $CO_2$ separate the holes/slots from the plate.

It is important to notice that the introduction of release lines and the path traced by the defocused CO2 laser is carefully planned to avoid issues, such as coincident start/stop position. In general, the slow acceleration/deceleration of the moving stages can be enough to create a punctual stress source that will later crack or even shatter the part. The introduction of release lines and the path traced by the defocused CO2 laser is carefully planned to avoid stopping or "parking" the defocused $CO_2$ laser on any spot over the traced contour—most commonly this will melt the sapphire surface and/or create micro-cracks. The path of the $CO_2$ laser should be planned to start and finish outside the contour to be released.

Release lines should be planned to allow separation without premature collapse of the surrounding and supporting matrix.

Edge Cutting and Finishing

A description of example embodiments of system 100 now follows. Several of the more difficult cuts to that can be made by the embodiments of the present invention include cuts that are close to the peripheral edge of a transparent mother sheet (e.g., a large G6 glass sheet). The resultant substrates are converted into smaller sheets for use in applications such as, but not limited to, mobile phone, tablet computers, LCD display devices, and the like. In addition, it is useful to produce a tailored bevel on the sharp 90° edges of smaller faceplate sheets. While the prior art employs machining and polishing 90° edges to achieve the specified bevels or chamfers which can range from 0° to 90°, the present invention employs interface block 108 in system 100 to facilitate a tailored chamfer or bevel.

Within system 100, interface block 108 is placed within the existing beam light path. Interface block 108 can be of any desired shape/cross-section and length to create the desired beam directing effect. In addition, interface block 108 can be composed of one or more pieces of any transparent, solid material, and those transparent materials may exhibit different indexes of refraction. Specific materials for use in composing interface block 108 can include, for example, plastics, glasses, ceramics, crystalline materials all of which exhibit transparency at the laser cutting wavelength of interest (e.g., alumino silicate glasses (Corning Eagle and Eagle XG glasses), Sodium Alumino silicate glasses (Gorilla Glass 2318, 4318, etc. all manufactured by Corning, Inc.) Lithium alumino silicate glasses such as those produced by Schott, fused silica such as HPFS®, polymers such as polycarbonate, transparent epoxies, adhesives such as OCA, and melted optical glasses produced by Hoya, Schott and Ohara.) Of particular importance, however, in choosing a material is to choose one that has transparency in portions of the wavelength spectrum in which the substrate material to be cut is also transparent. For example, for alumino silicate glasses, interface block 108 must be transparent in the IR and/or visible range depending on whether the laser used for cutting is 1064 nm or 532 nm in wavelength. For crystalline materials like silicon and germanium which are not transparent in the visible spectrum, interface block 108 material must be transparent in the infrared spectrum. Thus, proper cutting wavelengths need to be chosen with regard to the combination of the interface block 108 and substrate 102 to be cut. In addition, it may be beneficial to use material having different indices of refraction in order to overcome specific technical problems or achieve difficult cutting angles. The current state of the art is described in Applicant's co-pending U.S. patent application Ser. No. 14/154,525, which describes the phenomenology of the cutting mechanism and system, and which is typically used in the perpendicular beam presentation to the substrate 102. The desire for introducing light directly into the substrate in the form of a cutting beam is limited by the angle of reflection and where total internal reflection starts to occur. The limit for angular cutting by moving the laser head an angle $\alpha$ is approximately 20 degrees. Most applications require a cutting angle of about 45 degrees. The limitations associated with directly introducing the laser beam into the substrate is overcome with use of interface block 108.

Figure 16:
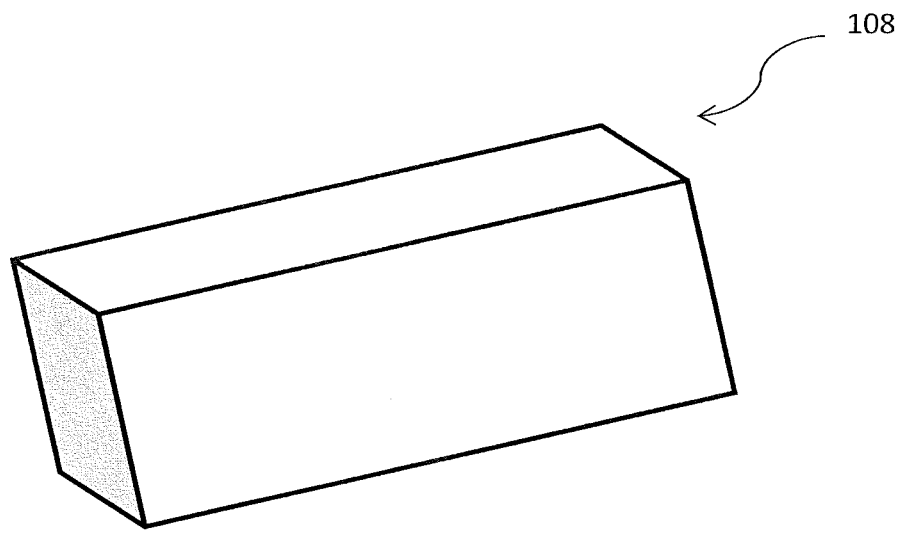
FIG. 16 is a perspective view of a rectangular parallelepiped shaped interface block in accordance with an embodiment of the present invention.
Figure 17:
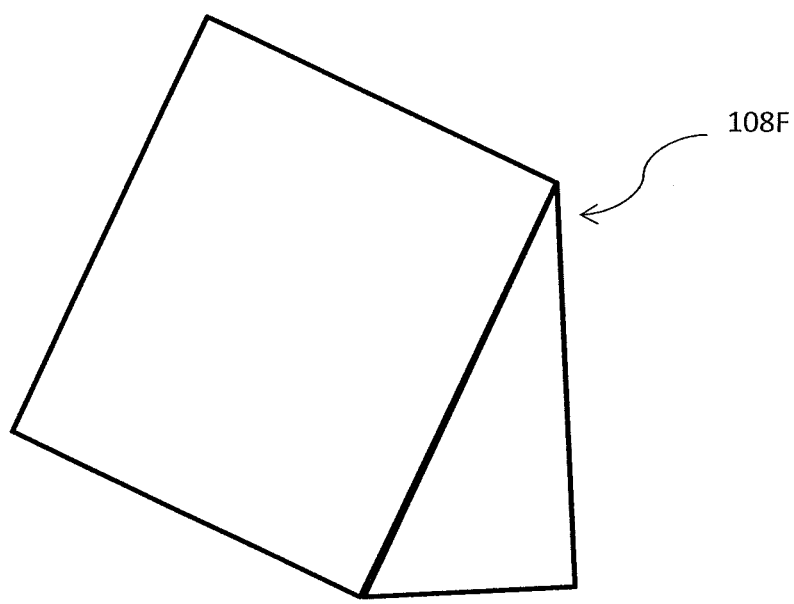
FIG. 17 is a perspective view of a triangular parallelepiped shaped interface block in accordance with an embodiment of the present invention.
Figure 22:
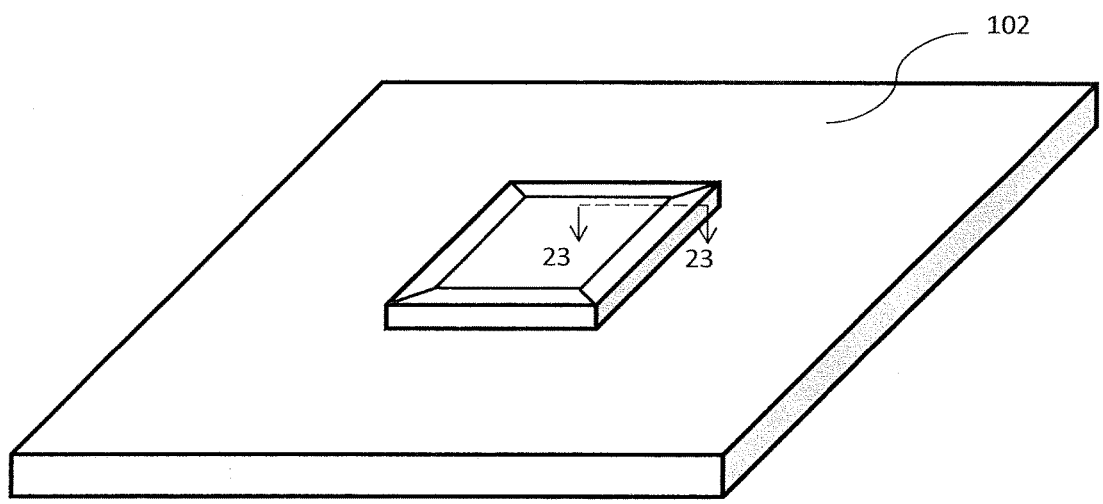
FIG. 22 is a perspective schematic view of an interface block formed as frame and positioned on a substrate to be cut.
Figure 23:
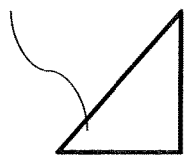
FIG. 23 is a cross-sectional view taken along section line 23-23 of FIG. 22.
Figure 24A:
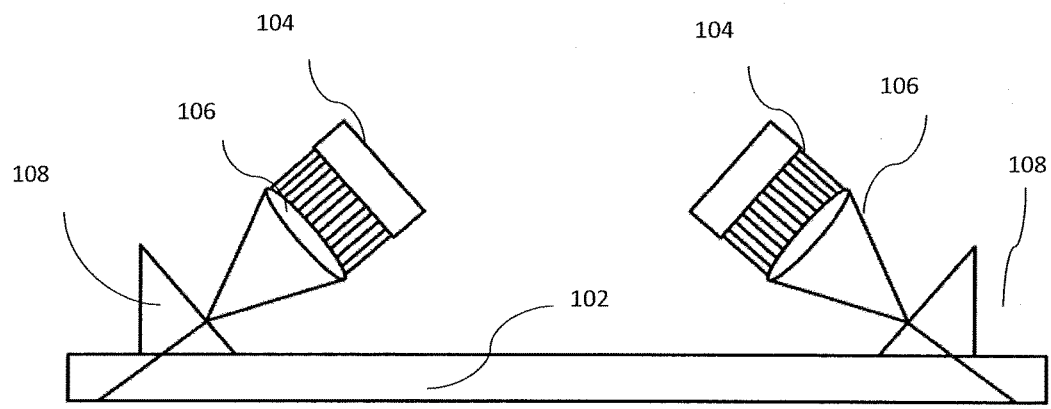
FIGS. 24A-24B are illustrative side elevation views of a laser system cutting a substrate using the frame of FIG. 22 and a substrate that has been cut using the frame of FIG. 22.
Figure 24B:
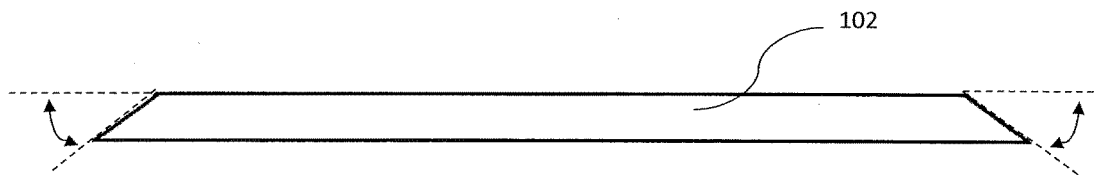

In one embodiment as shown in FIGS. 16 and 20A, interface block 108 is formed in the shape of a rectangular parallelepiped and is composed of a glass that is transparent at both the 532 nm and 1064 nm wavelengths. The material can be a polished piece of fused silica, for example, which transmits the desired wavelength, but of course many other types of glass could be used for cost or specific index of refraction needs, as will be understood by one of ordinary skill in the art. The interface block 108 may also be composed of molded plastic or formed as a glass frame, as illustrated in FIG. 22, which retains its surface finish via the molding process. It is also possible that the interface block 108 be small and articulated in relation to the beam movement or in combination with the beam linear movement and laterally with the desire to produce a specific edge profile in substrate 102.

Figure 20B:
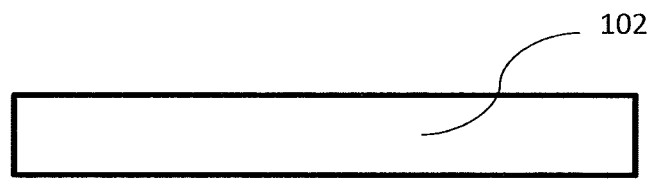

In this embodiment, interface block 108 is placed in a juxtaposed relation on top of the substrate 102 to be cut, as illustrated in FIG. 20A. Interface block 108 formed as a rectangular parallelepiped provides laser beam transmission volume (i.e., a uniform light path) to improve close to the edge cutting as seen in FIG. 20B. In addition, due to the Bessel beam being split and recombined at large angles, interface block 108 can be positioned outside the perimeter of the substrate 102 in order to enable close edge cutting.

When it is desired to create steeper angles for cutting, interface block 108 can be formed as a triangular parallelepiped, as shown in FIGS. 17, 18, 19, 21A, and 22-27. The angled surface can compensate for the desired chamfer angle and allow the laser to present the beam from laser 104 at a more preferable angle. Interface block 108 may be composed of the same or a different composition than substrate 102, and may have the same or a different index of refraction as substrate 102. The angle of the surface of interface block 108 first impinged with the beam of laser light can also be varied to provide a tailored modification of the optical path. Any combination of refractive index and angle can be combined to create the desired cutting angle and effect.

Interface block 108 can be fabricated at any angle between 0 and 90 degrees, e.g.: 10, 15, 20, 30, 40, or 45 degrees) and can be fabricated from a material having a desired refractive index (for example, the interface block 108 has at least two surfaces angled relative to another, so that the angle formed therebetween is >0 degrees and less than 90 degrees, in some examples the angle is 5 to 45 degrees.) Block 108 can be fabricated from a block or a strip of material which can be glass, ceramic, or plastic. In one embodiment, block 108 is machined to shape, and is then polished to be optically clear at the wavelength of the cutting beam. The block 108 may be made of fused silica transparent in both the visible and IR spectrums. When block 108 comprises a glass material, transparency may involve precision polishing of at least two transmission surfaces. As shown in FIG. 22, block 108 may be molded in a frame 23 that retains its transmissive surface finish via the molding process.

The process of using the triangular parallelepiped involves placing it on the substrate 102 to be cut. If desired, block 108 may be coated with an anti-reflection coating to reduce backscatter at the interface of block 108 and substrate 102. For example, such coating may be a single layer of Magnesium Fluoride ($MgF_2$) which is $\lambda/4$ in thickness based upon the specific wavelength of light chosen for the particular cutting application. In one embodiment, for example, the block 108 may be used in conjunction with a laser of 1064 nm wavelength. In this embodiment the $MgF_2$ anti-reflection layer is 266 nm thick. In addition or as an alternative to using antireflective coating, an index matching fluid can be disposed at the interface of block 108 and substrate 102 to reduce reflection losses. Laser 104 is then aligned appropriately to direct its beam through lens device 106 and block 108. If block 108 is formed as a rectangular parallelepiped, the angle of the beam would be 90 degrees; the angle can vary between 0 and 90 degrees if block 18 is formed as a triangular parallelepiped with or without anti-reflection coating and/or index matching fluid.

Block 108 provides for the preservation and presentation of the cutting beam, and also limits distortion and optical losses. When a rectangular shaped block having a uniform refractive index is employed, the process can produce a cut that is extremely close to the edge of the substrate 102. In the triangular shaped block 108, the process provides tailored chamfer angles.

Figure 18:
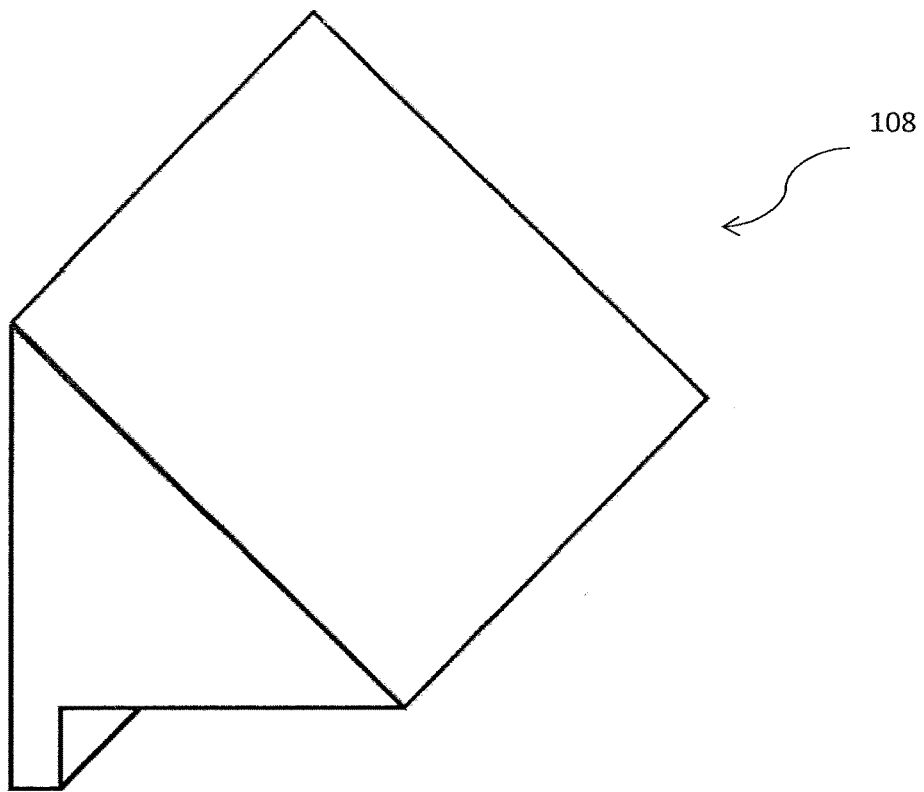
FIG. 18 is a perspective view of a rectangular parallelepiped shaped interface block with a notched step in accordance with an embodiment of the present invention.
Figure 25:
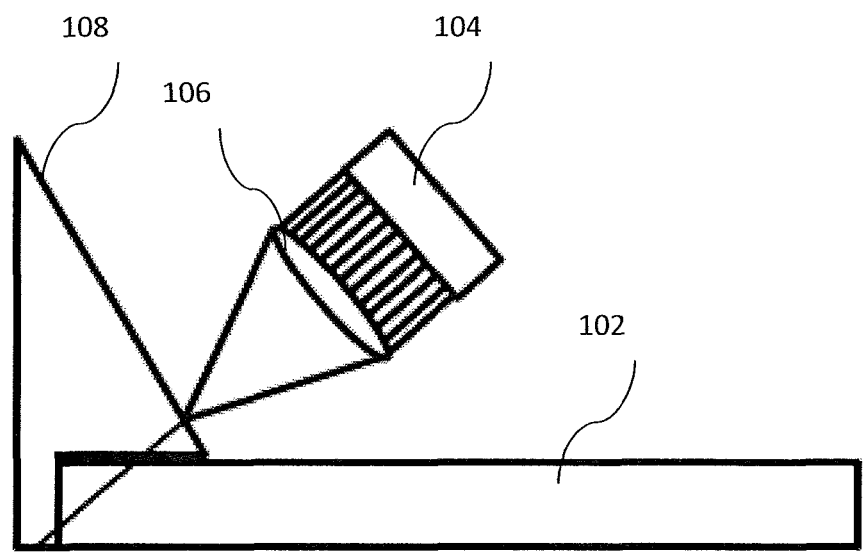
FIG. 25 is a side elevation schematic view of an alternate embodiment of an interface block with a notched shoulder.

With regard to FIGS. 18 and 25, block 108 may be modified to include a step or a notched shoulder 120 that extends along its entire length. An edge of substrate 12 may be received within a notched shoulder 120 formed in the block 108 (as shown in FIG. 25), thereby allowing even closer cutting edges with the shaped block 108, which could be for example a rectangular shaped blocked.

Figure 19:
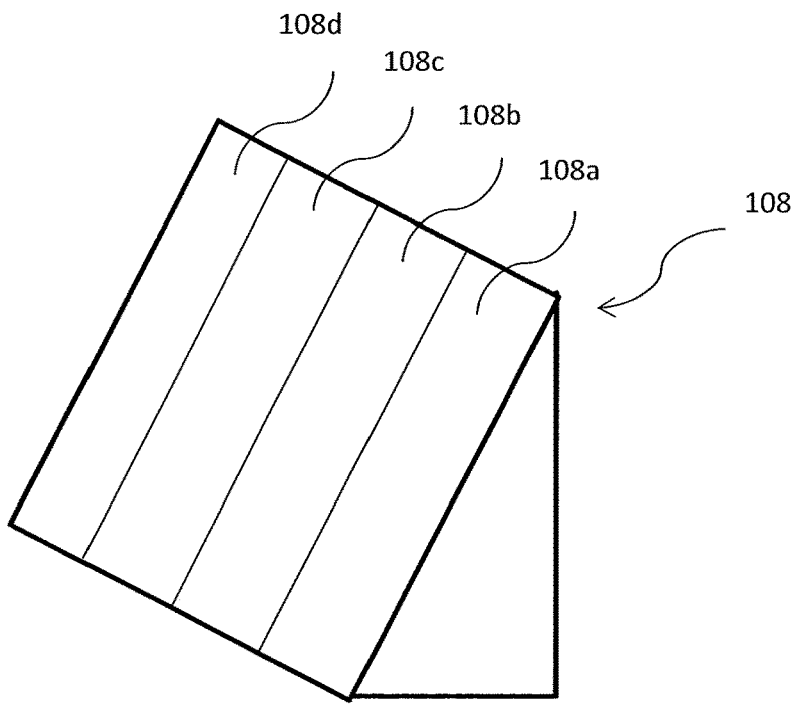
FIG. 19 is a perspective view of a triangular parallelepiped shaped interface block composed of GRIN materials in accordance with an embodiment of the present invention.

Referring to FIG. 19, a further embodiment of block 108 involves fabrication with gradient index materials (GRIN), for example, each section (108a, 108b, 108c, 108d, etc.) has a different index of refraction. Because GRIN materials have a non-uniform index of refraction, they can be used to focus or redirect light beams impinging upon them in some fashion. When the GRIN material is used with the rectangular shaped block 108, it is possible to steer or modify the beam profile such that the input beam injected in can be made to propagate and focus at an angle or along some defined curvilinear shape. This curvilinear beam is presented in the desired cutting zone to produce a bevel or chamfer or alternate shaped edge.

Figure 26:
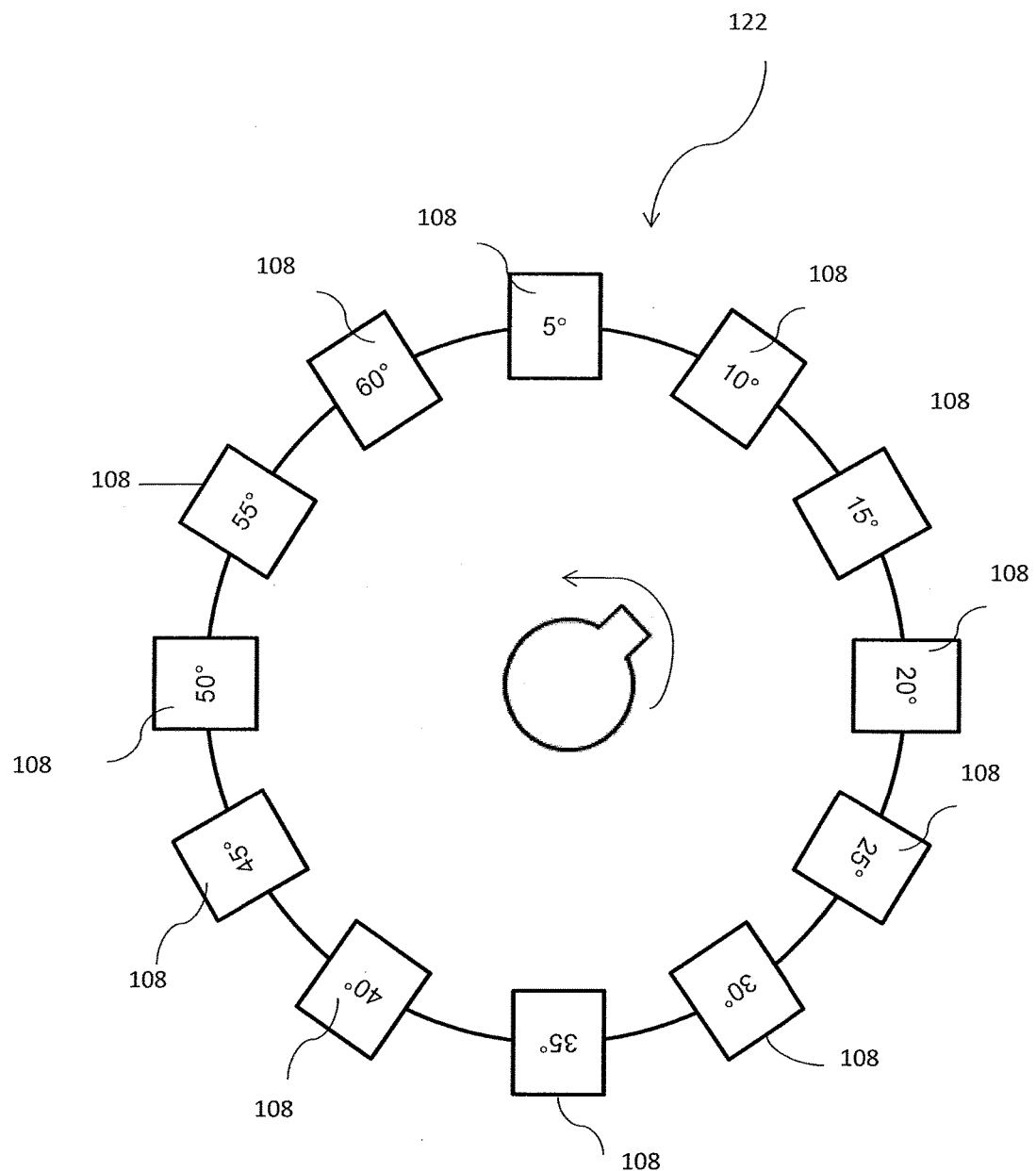
FIG. 26 is a top plan schematic view of a system of a plurality of interface blocks on a rotary pinion.
Figure 27:
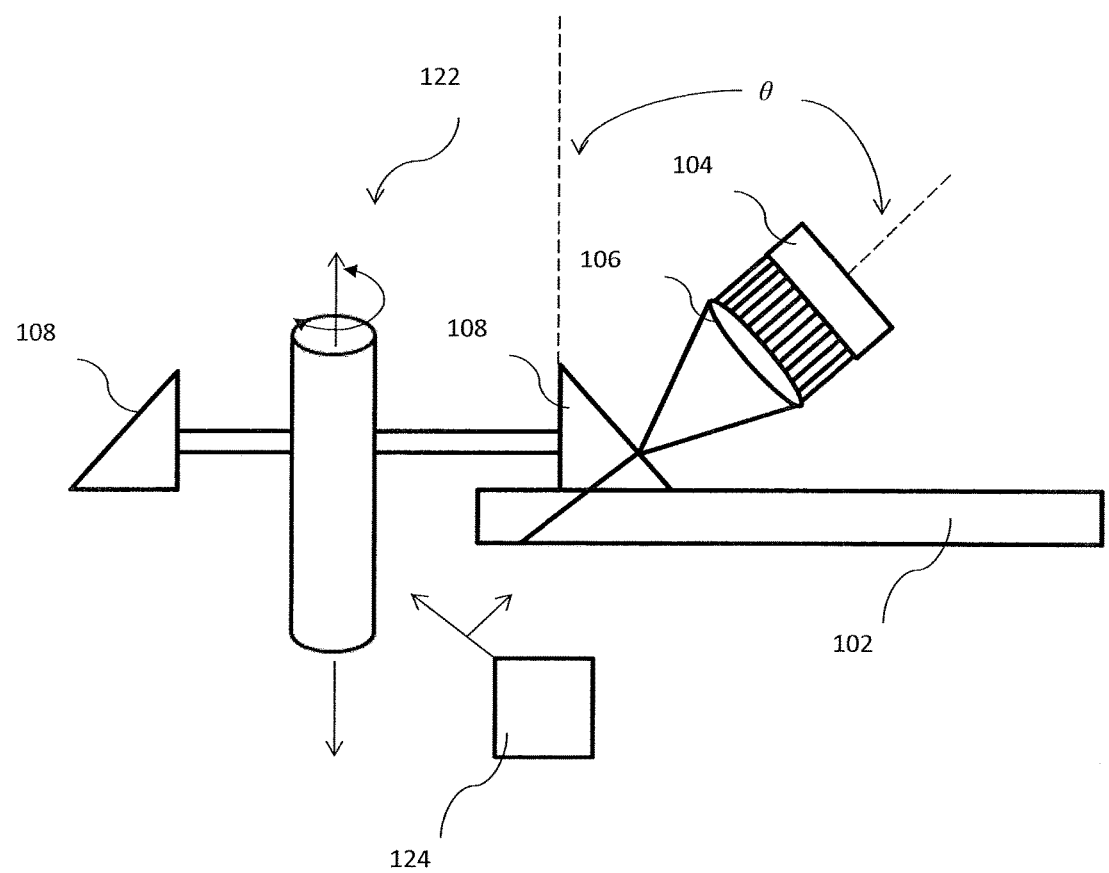
FIG. 27 is a front elevation schematic view of the system of FIG. 8.

With regard to FIGS. 26 and 27, a series of interface blocks 108 each characterized by a unique angle, can be arranged on a rotary pinion 122. This arrangement permits a user to select any one of the plurality of blocks 108 mounted on the pinion 122 to be brought into alignment with the beam cutting path. In this arrangement, a computer programmable controller 124 can be integrated into system 100 which permits the user to selectively choose from a variety of preplanned chamfer angles. In this arrangement, blocks 108 can be made up of individual prism pieces, cut from a semi-continuous piece with variable index along the edge, or made from one piece with various angular steps fabricated into a disk.

The pinion device 122 may follow the linear motion of the system's laser cutting head holding a stationary angle in the beam path, as it and the laser head translate along a path. The device can also be made to move side to side with respect to the linear motion of the beam. In some instances, particularly with the use of GRIN material, this can offer an advantage allowing variable bevel angles to be produced through the same cutting operation.

According to some embodiments a the method of processing or cutting a glass substrate comprises:

directing a laser beam into the substrate, the laser beam generating an induced nonlinear absorption within the substrate material, and the induced nonlinear absorption modifying the substrate material along the laser beam within the substrate; and translating the substrate and the laser beam relative to each other along a contour, thereby laser forming a plurality of defect lines along the contour within the substrate, wherein a periodicity between adjacent defect lines is between 0.1 micron and 25 microns (and preferably 0.1 to 20 microns, for example 2 to 15 microns).

According to some embodiments a the method of processing or cutting a glass substrate comprises:

focusing a pulsed laser beam into a laser beam focal line oriented along the beam propagation direction and directed into the substrate, the laser beam focal line generating an induced absorption within the substrate material, and the induced absorption producing a defect line along the laser beam focal line within the substrate; and translating the substrate and the laser beam relative to each other along a contour, thereby laser forming a plurality of defect lines along the contour within the substrate, wherein a periodicity between adjacent defect lines is between 0.1 micron and 20 microns.

Although the present invention has been described in connection with a preferred embodiment, it should be understood that modifications, alterations, and additions can be made to the invention without departing from the scope of the invention as defined by the claims.

What is claimed is:

1. A system for cutting a substrate that is transparent within a predetermined range of wavelengths in the electromagnetic spectrum, said substrate will include at least one edge when extracted from a sheet, the system comprising:
   a. a laser capable of emitting a beam of light along a light path and of a predetermined wavelength that is within the range of wavelengths in which the substrate is transparent;
   b. an optical element positioned in said light path of said laser; and
   c. an interface block composed of a material that is transparent over at least a portion of the predetermined range of wavelengths in the electromagnetic spectrum in which the substrate is also transparent, wherein said interface block is positioned in said light path and between the substrate and said optical element, and further wherein the beam of light will pass first through the optical element and subsequently through the interface block.

2. The system according to claim 1, wherein said interface block is shaped in the form of a rectangular parallelepiped.

3. The system according to claim 1, wherein said interface block is shaped in the form of a triangular parallelepiped.

4. The system according to claim 1, wherein said interface block is composed of a gradient index material.

5. The system according to claim 1, wherein said interface block is one of a plurality of movable blocks, each one of which comprises a planar surface, can be positioned in said light path, and is uniquely angled with respect to the substrate and relative to the others.

6. The system according to claim 5, further comprising a computer programmable controller adapted to permit a user to selectively move any one of said plurality of interface blocks into juxtaposition with the substrate.

7. The system according to claim 5, wherein each of said plurality of interface blocks is mounted on a rotary pinion.

8. The system according to claim 1, wherein said interface block comprises a notched shoulder formed therein, wherein said notched shoulder is adapted to receive one edge of the at least one edge of the substrate therein.

9. The system according to claim 1, further comprising antireflection coating disposed on a surface of said interface block that is in said light path.

10. The system according to claim 1, further comprising an index matching fluid disposed at the boundary between said interface block and the substrate.

11. The interface block according to claim 10, wherein said interface block is shaped in the form of a triangular parallelepiped.

12. A method for cutting at least one edge of a substrate that is transparent within a predetermined range of wavelengths in the electromagnetic spectrum, comprising the steps of:
   a. arranging a laser, an optical element and an interface block such that a beam of light emitted from said laser will pass first through said optical element and subsequently through said interface block, wherein said interface block is composed of a parallelepiped shaped material that is transparent over at least a portion of the predetermined range of wavelengths in the electromagnetic spectrum in which the substrate is also transparent;
   b. positioning said interface block in juxtaposed relation to said at least one edge of said substrate;
   c. emitting a beam of light from said laser at a wavelength that is within the range of wavelengths in which the substrate is transparent, said emitted beam of light following a path through said optical element and said interface block, whereby said interface block causes said beam of light to angularly intersect and pass through said substrate at a position adjacent to said at least one edge, wherein the beam of light will pass first through the optical element and subsequently through the interface block.

13. The method according to claim 12, wherein said interface block is one of a plurality of interface blocks and comprising the further step of selecting one of said plurality of interface blocks to be positioned within said beam of light.

14. The method according to claim 12, comprising the further step of providing an index matching fluid at the boundary between said interface block and the substrate.

15. The method according to claim 12, comprising the further step of providing an antireflection coating on a surface of said interface block.

* * * * *